US 012117249B2

(12) United States Patent
Erhard et al.

(10) Patent No.: US 12,117,249 B2
(45) Date of Patent: Oct. 15, 2024

(54) HEAT EXCHANGER ARRANGEMENT HAVING AT LEAST ONE MULTIPASS HEAT EXCHANGER AND METHOD FOR OPERATING A HEAT EXCHANGER ARRANGEMENT

(71) Applicant: Guntner GmbH & Co. KG, Furstenfeldbruck (DE)

(72) Inventors: Alfred Erhard, Achberg (DE); Hansjorg Brentrop, Oberhofen am Thunersee (CH)

(73) Assignee: Guntner GmbH & Co. KG, Furstenfeldbruck (DE)

(*) Notice: Subject to any disclaimer, the term of this patent is extended or adjusted under 35 U.S.C. 154(b) by 287 days.

(21) Appl. No.: 17/601,744

(22) PCT Filed: Mar. 23, 2020

(86) PCT No.: PCT/EP2020/057987
§ 371 (c)(1),
(2) Date: Oct. 6, 2021

(87) PCT Pub. No.: WO2020/212091
PCT Pub. Date: Oct. 22, 2020

(65) Prior Publication Data
US 2022/0170699 A1    Jun. 2, 2022

(30) Foreign Application Priority Data

Apr. 18, 2019    (DE) .................. 10 2019 110 237.5

(51) Int. Cl.
*F28F 27/00*    (2006.01)
*F28B 1/06*    (2006.01)
(Continued)

(52) U.S. Cl.
CPC ................ *F28F 27/00* (2013.01); *F28B 1/06* (2013.01); *F28D 1/024* (2013.01); *F28D 1/0435* (2013.01);
(Continued)

(58) Field of Classification Search
CPC .... F28F 2265/18; F28F 2265/06; F28F 27/00; F28F 9/0243; F28D 1/06; F28D 1/024;
(Continued)

(56) References Cited

U.S. PATENT DOCUMENTS 1,268,074 A    5/1918    Bancel
1,354,276 A    9/1920    Bancel
(Continued)

FOREIGN PATENT DOCUMENTS

DE    296 06 912 U1    7/1996
DE    196 13 910 A1    10/1997
(Continued)

OTHER PUBLICATIONS

U.S. Appl. No. 17/601,793 (US 2022/0205724), filed Oct. 6, 2021 (Jun. 30, 2022).
(Continued)

*Primary Examiner* — Devon Russell
(74) *Attorney, Agent, or Firm* — Baker Botts LLP

(57) ABSTRACT

The invention relates to a heat exchanger arrangement having at least one multipass heat exchanger, which comprises a first distributor (1), a second distributor (2) and at least one tubular diverter distributor (4) having a predefined tube cross-section ($A_U$), and a tube arrangement (25) having a plurality of tubes (5) which are at least substantially parallel to one another and have a predefined tube cross-section ($A_R$), through which a fluid—particularly, water— can flow and which are arranged in the tube arrangement (25) in columns with a predefined number of columns (n),
(Continued)

wherein the first distributor (1) and the second distributor (2) are arranged at one end (A) of the heat exchanger arrangement and the diverter distributor (4) is arranged at the opposing end (B), and the tubes (5) extend from the one end (A) to the opposing end (B) and are connected to the diverter distributor (4) and the first or the second distributor (1, 2), and at least one vent opening (10) is arranged at a highest point (T), or at least in the vicinity of the highest point (T), of the diverter distributor (4) to equalize the pressure with the surroundings. In order to enable rapid filling of the heat exchanger arrangement with the fluid, a valve (11) is arranged in the at least one vent opening (10). When the valve (11) is fully opened, a flow cross-section (d) is clear for the passage of air, and the pipe cross-section ($A_U$) of the diverter distributor (4) and the flow cross-section (d) of the valve (11) are the same as or greater than a minimum cross-section ($D_{min}$), which is calculated from the product of the number of columns in the tube arrangement (25) and the pipe cross-section ($A_R$) of the tubes ($D_{min}$=n $A_R$).

32 Claims, 12 Drawing Sheets

(51) Int. Cl.
  *F28D 1/02* (2006.01)
  *F28D 1/04* (2006.01)
  *F28D 1/053* (2006.01)
  *F28F 9/02* (2006.01)
(52) U.S. Cl.
  CPC ..... *F28D 1/05325* (2013.01); *F28D 1/05333* (2013.01); *F28D 1/05366* (2013.01); *F28F 9/0243* (2013.01); *F28D 2001/0266* (2013.01); *F28F 2265/06* (2013.01); *F28F 2265/18* (2013.01)
(58) Field of Classification Search
  CPC ............. F28D 1/04353; F28D 1/05325; F28D 1/05333; F28D 2001/0266
  See application file for complete search history.

(56) References Cited

U.S. PATENT DOCUMENTS

| | | | |
|---|---|---|---|
| 2,891,773 A * | 6/1959 | Heller | F28B 1/06 165/110 |
| 3,231,013 A | 1/1966 | Heller et al. | |
| 3,384,165 A | 5/1968 | Mathews | |
| 3,434,529 A * | 3/1969 | Harold | F01K 13/00 165/47 |
| 3,598,179 A | 8/1971 | Giauque | |
| 3,707,185 A * | 12/1972 | Modine | F25B 39/04 165/122 |
| 3,782,451 A * | 1/1974 | Cates | F28C 1/14 261/DIG. 11 |
| 3,825,060 A * | 7/1974 | Heller | F28B 1/00 137/520 |
| 3,825,062 A | 7/1974 | Heller et al. | |
| 3,830,293 A | 8/1974 | Bell | |
| 4,747,980 A | 5/1988 | Bakay et al. | |
| 5,548,958 A * | 8/1996 | Lewis | F01K 25/08 60/693 |
| 6,126,151 A | 10/2000 | Vodicka | |
| 6,574,980 B1 | 6/2003 | Morrison | |
| 9,448,018 B2 | 9/2016 | Cooney | |
| 2006/0027355 A1 | 2/2006 | Dorin | |
| 2014/0076518 A1 | 3/2014 | Edwards et al. | |
| 2015/0377559 A1 | 12/2015 | Csaba et al. | |
| 2016/0054077 A1 | 2/2016 | Saito et al. | |
| 2017/0299269 A1 * | 10/2017 | Ausman | F28F 9/0231 |
| 2020/0279662 A1 | 9/2020 | Marquino et al. | |
| 2022/0136776 A1 | 5/2022 | Erhard et al. | |
| 2022/0170699 A1 | 6/2022 | Erhard et al. | |

FOREIGN PATENT DOCUMENTS

| | | | | |
|---|---|---|---|---|
| DE | 199 58 377 A1 | | 8/2000 | |
| GB | 1001101 A | * | 8/1965 | |
| KR | 10-0752048 B1 | | 8/2007 | |
| WO | WO 1990/015299 A1 | | 12/1990 | |
| WO | WO-2005088217 A1 | * | 9/2005 | ................ F28B 1/06 |
| WO | WO-2018184908 A1 | * | 10/2018 | ................ F28B 1/06 |

OTHER PUBLICATIONS

U.S. Appl. No. 17/601,793, filed Aug. 11, 2023 Non-Final Office Action.
Translation of Patent Document DE19613910A1 entitled Translation—DE19613910A1 (2013).
Translation of Patent Document DE29606912U1 entitled Translation—DE29606912U1 (2023).
Translation of Patent Document KR100752048B1 entitled Translation—KR100752048B1 (2023).
Translation of Patent Document WO9015299A1 entitled Translation—WO9015299A1 (2023).

* cited by examiner

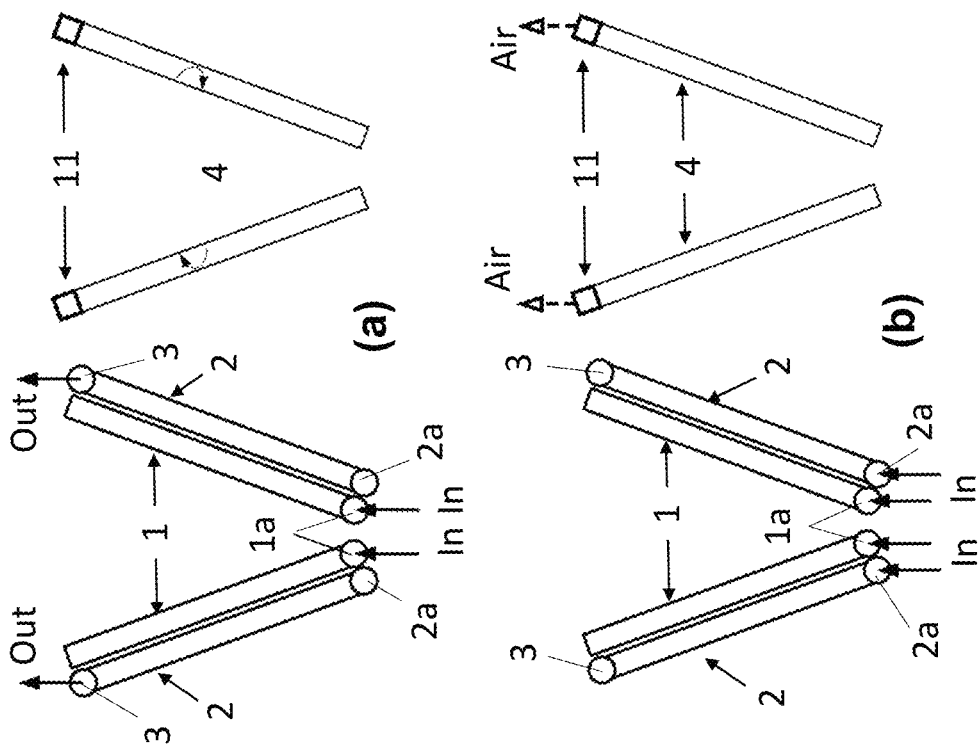
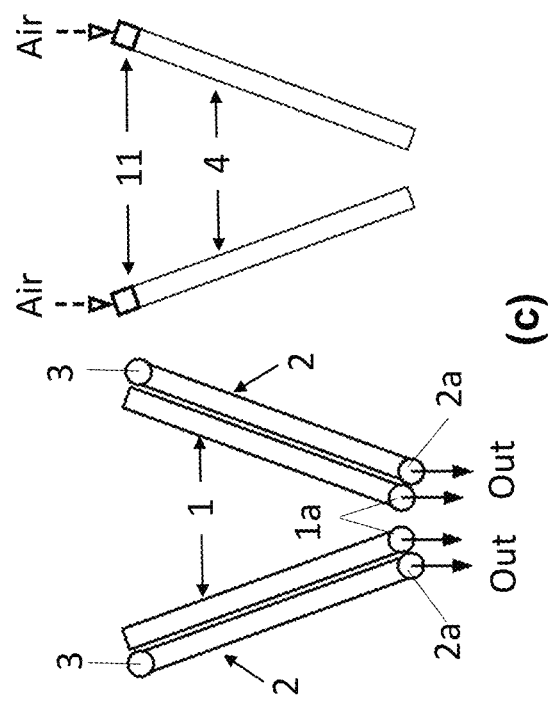
Fig. 5

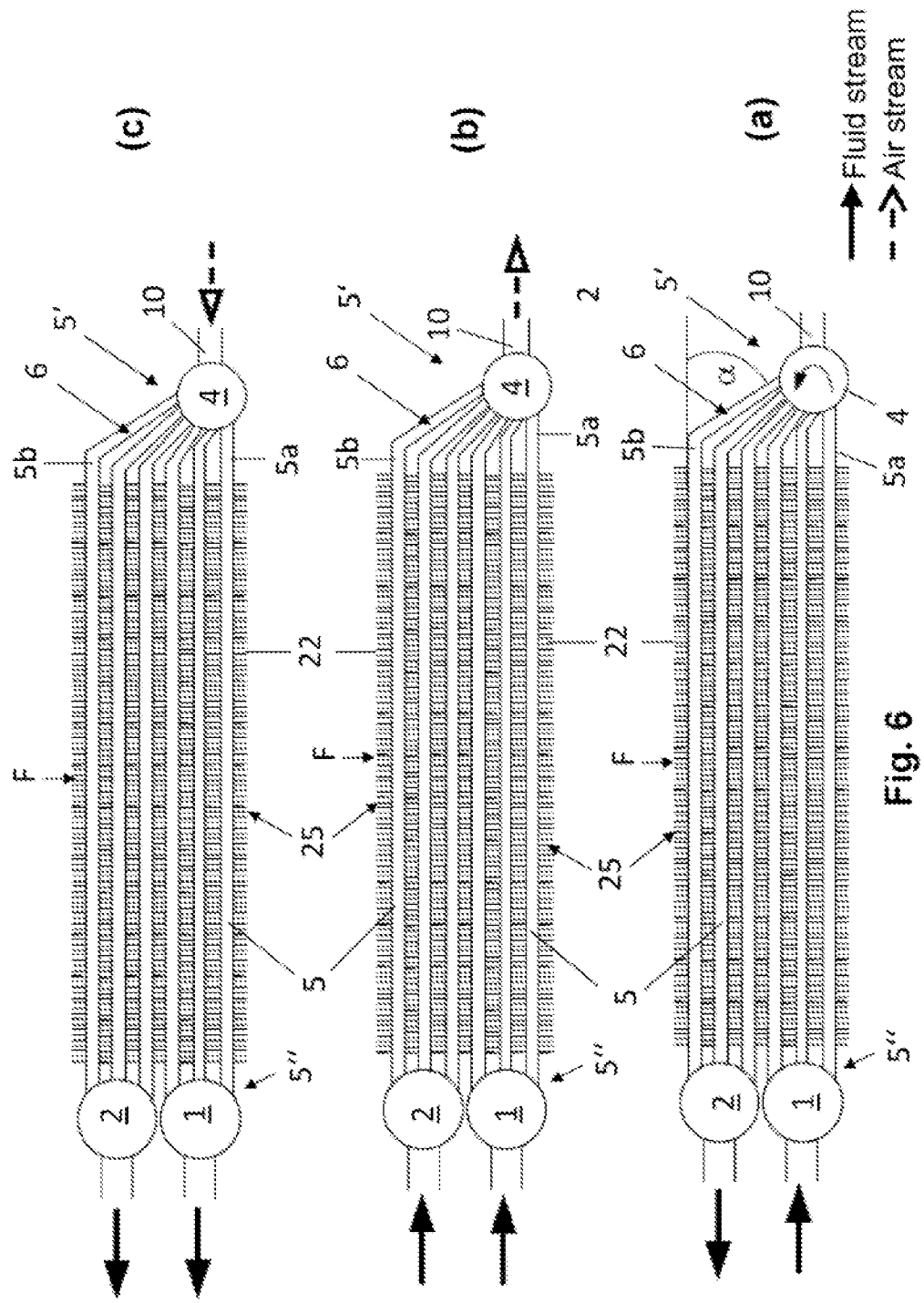

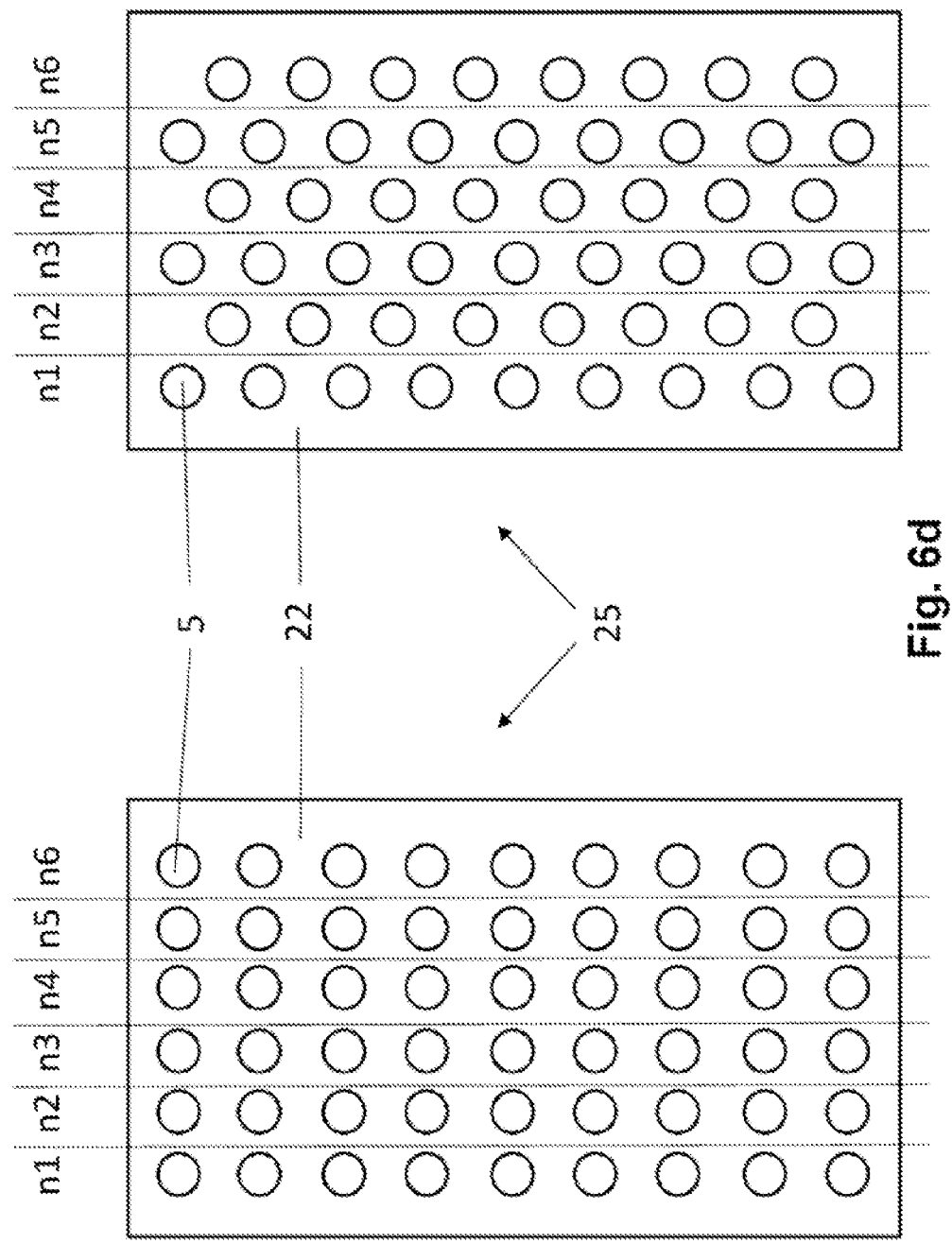

HEAT EXCHANGER ARRANGEMENT HAVING AT LEAST ONE MULTIPASS HEAT EXCHANGER AND METHOD FOR OPERATING A HEAT EXCHANGER ARRANGEMENT

The invention relates to a heat exchanger arrangement having at least one multipass heat exchanger, which comprises a first and a second distributor, each having a connector piece for connection to a fluid line, at least one first diverter distributor, and a plurality of tubes, wherein a fluid—in particular, water—is able to flow through the tubes, wherein at least one vent opening (10) is arranged in the diverter distributor to equalize pressure with the surroundings. The invention further relates to a method for operating a heat exchanger arrangement of this kind.

Heat exchanger arrangements of this kind having at least one multipass heat exchanger can be used, for example, as recoolers in cooling systems for cooling a fluid that is used as the heat transfer medium in the cooling system. The recooler is generally placed outside a facility to be cooled—for example, outside a building. If water is used as the heat transfer medium, there is therefore a risk of the heat transfer medium freezing in the event of frost at the location where the recooler is installed.

Cooling systems having heat exchanger arrangements that allow the recooler to be emptied in an anti-freeze mode are therefore known from the prior art. By way of example, WO2018/184908 A1 discloses a cooling system in which water is circulated as the heat transfer medium, said system containing a recooler and a water tank, wherein the recooler comprises, at a first end region, an inlet collector and an outlet collector, and, at its second end region opposite the first end region, a diverter collector having a first and a second branch, which are arranged in a V-shape with respect to one another. The first branch and the second branch of the diverter collector are interconnected via a connecting branch arranged at their top end, wherein a vent opening open to the surroundings is arranged in the connecting branch. A first tube arrangement which rises in a flow direction extends between the inlet collector and the first branch of the diverter collector, and a second tube arrangement which falls in the flow direction extends between the second branch of the diverter collector and the outlet collector. The non-pressurized water tank is connected to an inlet at the inlet collector and to an outlet at the outlet collector such that the cooling water stored in the water tank can be conducted through the recooler in a closed circuit. For ventilation purposes, the water tank is connected to the recooler via a ventilation line which opens into the vent opening at the connecting branch of the diverter collector. The recooler thus formed therefore has two single-pass registers connected in series, having a first tube arrangement, in the form of a supply line, which connects the inlet collector to the diverter collector and forms a first single-pass register, and a second tube arrangement, which forms a second single-pass register and runs between the diverter collector and the outlet collector, in order to connect the diverter collector to the outlet collector. In a recooling mode, the water conducted through the tube arrangements is cooled by heat exchange with drawn-in ambient air. For this purpose, the cooling water stored in the water tank is conducted through the recooler by means of a circulating pump. To empty the recooler if there is a risk of frost, this known cooling system provides for the circulating pump to be switched off. When the circulating pump is switched off, the recooler empties automatically as a result of the constant ventilation of the diverter collector in conjunction with the gradient of the two tube arrangements of the two single-pass registers.

However, heat exchanger arrangements having one or more single-pass registers connected in series (single-pass heat exchangers) have a lower cooling efficiency compared with multipass systems, in which the cooling medium passes through the heat exchanger(s) several times. Heat exchanger arrangements having multipass registers are therefore frequently used to improve the cooling efficiency and increase cooling performance. This is especially necessary if a cooling performance of between 100 and 1,500 kW is to be achieved.

A cooling arrangement having a two-pass register is known, for example, from WO 90/15299-A. The cooling water used therein as the heat transfer medium flows through a heat exchanger of the cooling system twice (two-pass heat exchanger). For this purpose, a heat exchanger is provided, having an inlet collector arranged at one end of the heat exchanger and an outlet collector and a diverter collector arranged at the opposing end, wherein tubes in the form of supply lines extend between the inlet collector and the diverter collector, and tubes in the form of recirculating lines extend between the diverter collector and the outlet collector. In a recooling mode, the cooling water is first conducted through the supply lines in a first pass and through the recirculating lines in a second pass. As the cooling water passes through the tubes of the two-pass heat exchanger, heat exchange takes place with an air stream of ambient air drawn in by a fan and conducted through the two-pass heat exchanger, in order to cool the cooling water.

When using multipass heat exchangers in regions at risk of frost, there is a danger that the multipass heat exchanger cannot be emptied quickly enough or completely in order to prevent the heat transfer medium (in particular, cooling water) from freezing. Particularly when the temperature of the heat transfer medium located in the multipass heat exchanger drops very quickly as a result of a rapid decrease in the ambient temperature or a strong wind influence on the heat exchanger, it must be ensured, even when using multipass heat exchangers, that the heat exchanger can be completely emptied within a very short period of time, in order to prevent the heat transfer medium from freezing. However, rapid emptying of a multipass heat exchanger is difficult due to the long tubes through which the heat transfer medium flows several times and the resulting long transport paths of the heat transfer medium through the tubes of the multipass heat exchanger. The length of the tubes (of a supply and recirculating line) can be between 3 and 15 m. For the same reason, rapid refilling of a multipass heat exchanger when resuming recooling mode once the risk of frost has passed is also difficult.

On that basis, the aim of the invention is to disclose a heat exchanger arrangement having at least one multipass heat exchanger, said arrangement having high cooling performance while being as efficient as possible, and being able to be emptied as quickly and completely as possible if there is a risk of frost, and also refilled with a heat transfer medium as quickly as possible in order to resume a cooling mode once the frost risk has passed. A further aim is to prevent excess fluid escaping from the heat exchanger, and in particular from the at least one diverter distributor of the multipass heat exchanger, when the at least one multipass heat exchanger is being filled.

According to the invention, these aims are achieved by a heat exchanger arrangement. A cooling system, in which a heat exchanger arrangement according to the invention is used as a recooler for cooling a fluid used as the heat transfer medium, also contributes to achieving the aims.

The heat exchanger arrangement according to the invention comprises at least one multipass heat exchanger, which comprises a first distributor, a second distributor, at least one tubular diverter distributor having a predefined tube cross-section ($A_U$), and a tube arrangement having a plurality of tubes which are at least substantially parallel to one another and have a predefined tube cross-section ($A_R$), wherein a fluid—particularly, water—is able to flow through said tubes, and the tubes are arranged in the tube arrangement in columns with a predefined number of columns (n), the first distributor and the second distributor are arranged at one end of the heat exchanger arrangement and the diverter distributor is arranged at the opposing end, and the tubes extend from the one end to the opposing end and are connected to the diverter distributor and to the first or the second distributor, and at least one vent is arranged at a highest point, or at least in the vicinity of the highest point, of the diverter distributor to equalize the pressure with the surroundings. In the process, it is provided that, according to the invention,
a) a valve be arranged in the at least one vent opening and be able to be opened and closed, wherein a flow cross-section (d) is cleared for the passage of air when the valve is fully opened,
b) the tube cross-section ($A_U$) of the diverter distributor and the flow cross-section (d) of the valve be the same as or larger than a minimum cross-section ($D_{min}$),
c) wherein the minimum cross-section ($D_{min}$) is calculated from the product of the number of columns in the tube arrangement and the tube cross-section ($A_R$) of the tubes ($D_{min}$=n $A_R$).

Where reference is made to a highest point of a distributor, the geodetically highest point of the distributor in question is what is meant. Where reference is made to a lowest point, the geodetically lowest point of the device (distributor) in question is what is meant—in particular, the lowest point as viewed in relation to the vertical direction. This also includes a point that is at least in the vicinity of the geodetically highest or geodetically lowest point.

By arranging the valve in the at least one vent opening of the diverter distributor, it is possible to prevent the fluid from flowing out of the vent opening, and thus out of the heat exchanger, when the multipass heat exchanger is being filled. The dimensions selected according to the invention, in which the tube cross-section ($A_U$) of the diverter distributor and the flow cross-section (d) of the valve are equal to or larger than a minimum cross-section ($D_{min}$), which is calculated from the product of the number of columns in the tube arrangement and the tube cross-section ($A_R$) of the tubes ($D_{min}$=n·$A_R$), furthermore ensure that, when the multipass heat exchanger is being filled, the entire fluid volume filled into the tubes per unit of time via the first and the second distributors can be accommodated by the at least one diverter distributor, and the air located in the diverter distributor can escape entirely through the vent opening, in order to ventilate the diverter distributor.

The valve is preferably in the form of an automatically-closing control valve that closes by itself (i.e., without external actuation) when the fluid enters the valve. As a result, the vent opening can be automatically closed as soon as the diverter distributor is at least largely completely filled with fluid. Since the vent opening is, expediently, arranged at the highest point of the diverter distributor, the valve closes automatically only when the diverter distributor is completely filled with fluid, i.e., up to its top end, at which the vent opening is located. This enables the heat exchanger to be completely filled without the fluid being able to flow out of the heat exchanger.

However, the valve can also be actuated hydraulically, pneumatically, or electrically. Where the valve is actuated hydraulically, pneumatically, or electrically, a control signal for opening or closing the valve is, expediently, generated by a control device as a function of a calculated filling time or a measured hydrostatic pressure of the fluid in the heat exchanger arrangement, and is transmitted to the valve. In this way, the valve can, for example, be closed when a filling mode is terminated, in order to prevent the fluid from flowing out of the heat exchangers, and in particular out of the diverter distributors thereof, once the heat exchanger arrangement is completely full. The valve is closed, for example, once a filling time calculated by the control device from the parameters of the heat exchanger arrangement has elapsed, or as soon as a hydrostatic pressure of the fluid in the heat exchanger detected by a pressure sensor exceeds a predetermined pressure limit value.

In a preferred embodiment, the valve has a chamber and a float movably mounted therein, wherein the float closes the valve when the fluid enters the chamber—in particular, when the fluid reaches or exceeds a predetermined level in the chamber.

Using a multistage valve—in particular, a two-stage valve that closes gradually when the fluid enters—is particularly preferred. As a result, it can be ensured, on the one hand, that the heat exchanger is fully ventilated while the heat exchanger is being filled with the fluid as long as there is still air therein (and, in particular, in the diverter distributor), and, on the other, that the valve is fully closed as soon as the heat exchanger is completely filled with the fluid.

The gradual closing of the valve is, expediently, configured such that the vent opening is fully closed in an airtight manner by the valve as soon as the fluid in a chamber of the valve reaches a predetermined level. For this purpose, a valve body is movably mounted in the chamber, wherein the valve body first moves in the direction of a valve seat, when the fluid enters the chamber, and is ultimately pressed against the valve seat, whereby the flow cross-section (d) of the valve in a first closure stage, initially, only partially closes, such that air can still flow out of the valve. Airtight sealing of the valve (taking place subsequently in a second stage) can be enabled by a plurality of openings in the valve body, wherein the openings form a part of the flow cross-section (d) of the valve, and the valve body is coupled to the movably-mounted float such that, as the internal pressure in the chamber increases, the openings are closed smoothly until the entire flow cross-section (d) of the valve is closed fully and in an airtight manner in a second closure stage.

In a preferred exemplary embodiment of the heat exchanger arrangement according to the invention, the tube arrangement of the multipass heat exchanger comprises between 4 and 10 columns, and preferably between 5 and 7 columns, so the number of columns n is between 4 and 10, and preferably between 5 and 7. The internal diameter of the tubes is 15 mm, for example. The resulting minimum cross-section ($D_{min}$=n $A_R$) is accordingly between 5 and 20 cm², and, in particular, between 10 and 15 cm². When the tubes have an internal diameter of 20 mm, a minimum cross-section ($D_{min}$=n $A_R$) of 10 to 35 cm² is obtained (where n is between 4 and 10).

The tube cross-section ($A_U$) of the diverter distributor can be selected to be larger than the flow cross-section (d) of the valve. This allows the fluid volume flowing out of the tubes into the diverter distributor during filling to be accommodated in full and without any difficulty, while still ensuring that the diverter distributor can be completely ventilated as a result of the air escaping via the (at least partially open) valve. In preferred exemplary embodiments, the diameter ($D_U$) of the diverter distributor is between 30 mm and 200 mm. The flow cross-section (d) of the valve is, expediently, between 10 and 30 cm², and preferably between 15 and 25 cm².

To allow the diverter distributor to be completely closed for maintenance and inspection work, even without the heat exchanger being (completely) filled, a manually-operable inspection valve, by which the vent opening can be closed, is, expediently, provided in addition to the valve.

To allow the heat exchanger arrangement to be filled and emptied as quickly as possible, a first connector piece is arranged at a lowest point, or at least in the vicinity of the lowest point, of the first distributor, and a second connector piece is arranged at a lowest point, or at least in the vicinity of the lowest point, of the second distributor. A third connector piece is preferably arranged at a highest point, or at least in the vicinity of the highest point, of the second distributor. Furthermore, the tubes of the tube arrangement are, expediently, inclined relative to the horizontal plane, and preferably towards the front end of the heat exchanger arrangement, where the first and second distributors are arranged. As a result, the multipass heat exchanger(s) can be quickly emptied of and filled with the fluid used as the heat transfer medium, since, if there is a risk of frost, in an emptying mode, the fluid can drain out of all the tubes simultaneously, under the effect of gravity and due to the slope of the tubes relative to the horizontal, into the first and the second distributors, and thence, in each case via the connector piece arranged at the lowest point of the first or second distributor (first and second connector pieces, respectively), into a fluid line connected to the connector pieces. Accordingly, in a filling mode, the fluid can be conducted very quickly out of the first and the second distributors into all the tubes of the multipass heat exchanger simultaneously, counter to gravity. As a result, the emptying or filling time when the heat exchanger is being emptied or filled is considerably reduced, because the fluid is not conducted into the multipass-heat exchanger(s) according to the flow paths when the heat exchanger arrangement is in recooling mode, but, rather, it can flow into or out of all the tubes of the multipass heat exchanger simultaneously via the first and second distributors.

Rapid outflow of the fluid out of the tubes of the multipass heat exchanger in emptying mode is assisted by the slope of the tubes relative to the horizontal plane. The tubes, which are, expediently, parallel to one another in the tube arrangement, preferably form an angle of between 0.5° and 5°—particularly preferably, an angle of between 2° and 4°, and, in particular, 3°—with the horizontal.

The multipass heat exchanger can, for example, be a two-pass heat exchanger in which the fluid flows through the tubes of the heat exchanger twice while being in heat exchange with cooling air, which is, expediently, drawn in from the surroundings by one or more fans and conducted through the heat exchanger.

The tubes of each multipass heat exchanger are divided into a first and a second group of tubes, wherein the first group of tubes serve as supply lines, and the second group of tubes serve as recirculating lines. In recooling mode, the fluid can, for example, be conducted into the first distributor via the first connector piece, which is in the form of an inlet distributor, and the fluid flows through the supply lines (first group of tubes) of the two-pass heat exchanger in a first pass to the first diverter distributor, whence it is deflected into the recirculating lines (second group of tubes), such that the fluid can then flow back to the second distributor (outlet distributor) in the recirculating lines in a second pass. The fluid leaves the two-pass heat exchanger via the third connector piece arranged at the highest point of the second distributor. In the process, the two distributors (first and second distributors) are also interchangeable with one another, i.e., it is possible for the fluid first to flow into the second distributor, in the form of an inlet distributor, and to flow out of the first distributor, in the form of an outlet distributor.

The multipass heat exchanger can also be a four-pass heat exchanger, in which the fluid flows through the tubes of the heat exchanger four times while being in heat exchange with the cooling air. In a four-pass heat exchanger, a second and a third diverter distributor are provided in addition to the first and second distributors and the first diverter distributor, wherein the first and second distributors and the third diverter distributor are arranged at one end of the heat exchanger arrangement, and the first and second diverter distributors are arranged at the opposing end of the heat exchanger arrangement, and the tubes extend from the one end to the opposing end in order to connect the first and second distributors to one of the diverter distributors. In turn, a connector piece is arranged at a lowest point, or at least in the vicinity of the lowest point, of the first distributor and the second distributor (first and second connector pieces), and in turn, on the second distributor, a third connector piece is arranged at a highest point, or at least in the vicinity of the highest point, of the second distributor. A fourth connector piece is, expediently, arranged on the third diverter distributor at a lowest point, or at least in the vicinity of the lowest point, of the third diverter distributor.

When the four-pass heat exchanger is in recooling mode, the fluid can, for example, be conducted into the first distributor via the first connector piece, which is in the form of an inlet distributor, and the fluid flows through the supply lines (first group of tubes) of the four-pass heat exchanger in a first pass to the first diverter distributor, whence it is deflected into the recirculating lines (second group of tubes) such that the fluid then flows back to the third diverter distributor at the first end of the heat exchanger arrangement in the recirculating lines in a second pass, whence it is deflected again by the third diverter distributor into tubes of the first group (supply lines) and flows to the second diverter distributor in a third pass, whence it is deflected again into tubes of the second group (recirculating lines) in order to lastly flow back to the second distributor (outlet distributor) in a fourth pass. The fluid leaves the multipass heat exchanger via the third connector piece arranged at the highest point of the second distributor. In the process, the two distributors (first and second distributors) are also interchangeable with one another, i.e., it is possible for the fluid first to flow into the second distributor, in the form of an inlet distributor, and to flow out of the first distributor, in the form of an outlet distributor.

To ensure that the multipass heat exchanger is completely filled with fluid at all times during filling and when in recooling mode (whereby improved efficiency can be achieved), it is preferable, in both the two-pass and four-pass heat exchangers, for the fluid to enter the heat exchanger via the first connector piece (at the lowest point of the first distributor) and leave the heat exchanger at the second connector piece (at the highest point of the second distributor).

The distributors, i.e., the first and second distributors and each diverter distributor, can each be in the form of tubular manifolds. The tubes of the distributors can be arranged having their longitudinal axis vertical or inclined obliquely to the vertical.

High heat-exchange efficiency and a compact design of the heat exchanger arrangement can be achieved if the heat exchanger arrangement contains two multipass heat exchangers arranged opposite one another, wherein the two multipass heat exchangers are inclined obliquely to the vertical and arranged in a V-shape with respect to one another. The tubular distributors (first distributor, second distributor, and the diverter distributors) likewise run obliquely to the vertical, in accordance with said oblique arrangement of the heat exchangers.

A particularly compact design can be achieved if the first and the second diverter distributors are contained in a common collector tube having a partition wall arranged therein, wherein the partition wall divides the common collector tube into an inflow region, which forms the first distributor, and an outflow region, which forms the second distributor. In the four-pass heat exchanger, the first and the second diverter distributors, which are each arranged adjacently to one another at the other end of the heat exchanger arrangement, can also accordingly be arranged in a common collector tube having a partition wall, wherein the partition wall divides the collector tube into at least two regions, wherein a first region forms the first diverter distributor, and a second region forms the second diverter distributor.

In the four-pass heat exchanger, the first distributor, the second distributor, and the third diverter distributor, which are each arranged adjacently to one another at one end of the heat exchanger arrangement, can also accordingly be arranged in a common collector tube, wherein the collector tube in turn contains a partition element which divides the collector tube at least into an inflow region (which forms the first distributor), an outflow region (which forms the second distributor), and a diverter region (which forms the third diverter distributor). The first, second, third, and fourth connector pieces are arranged in the common collector tube, wherein the first connector piece is arranged in the inflow region at a lowest point of the common collector tube, the second connector piece is arranged in the outflow region at a highest point of the common collector tube, the third connector piece is arranged in the outflow region at a lowest point of the common collector tube, and the fourth connector piece is arranged at a lowest point of the diverter region.

To be able to open or close the first and second connector pieces, and, where applicable, the fourth connector pieces present in the four-pass heat exchanger, which are each arranged at a lowest point of the relevant distributor (first distributor and second distributor, and third diverter distributor, where applicable), depending upon the operating mode of the heat exchanger arrangement, a controllable valve is preferably assigned to each of said connector pieces. The controllable valve can be arranged, in particular, in the relevant connector piece (first, second, or fourth connector pieces). The controllable valves can, for example, be actuated hydraulically, pneumatically, or electrically.

In an expedient embodiment of the heat exchanger arrangement, the first and second distributors and the third diverter distributor are arranged at a front end face of the heat exchanger arrangement, and the first and the second diverter distributors are arranged at the opposite, rear end face of the heat exchanger arrangement. In the four-pass heat exchanger, the third diverter distributor is arranged on the front end face adjacently to the first and second distributors, and the second diverter distributor is arranged on the rear end face adjacently to the first diverter distributor. As a result, it is possible to ensure a compact design of the heat exchanger arrangement, and dimensions that satisfy the requirements in terms of cooling performance.

In both the two-pass and four-pass versions, the heat exchanger arrangement according to the invention can be operated in various operating modes—in particular, in a recooling mode, an emptying mode if there is a risk of frost, a filling mode for filling the heat exchanger arrangement for the first time or refilling it once the frost risk has passed, and a standby mode once the heat exchanger arrangement has been emptied when there is a risk of frost or ongoing frost. A control device for controlling the heat exchanger arrangement is provided for switching the heat exchanger arrangement from one operating mode to another operating mode. The heat exchanger arrangement, and in particular the setting of a suitable operating mode, are controlled as a function of environmental parameters, such as the outside temperature and the wind speed, at the site where the heat exchanger arrangement is installed. To detect the environmental parameters, sensors—in particular, a thermometer for detecting the outside temperature and a wind gage for detecting the wind speed—are, expediently, provided and coupled to the control device. The measured values of the environmental parameters, as detected by the sensors, are supplied to the control device. In addition to the environmental parameters such as the outside temperature and the wind speed, the input temperature of the fluid as it enters the heat exchanger arrangement is, expediently, detected via further sensors—in particular, thermometers. Furthermore, the volume flow rate of the fluid stream flowing into the heat exchanger arrangement or flowing out of the heat exchanger arrangement can be measured by means of pressure or flow sensors and forwarded to the control device. The control device calculates a predicted output temperature of the fluid as it exits the heat exchanger arrangement on the basis of the supplied measured values—in particular, taking into account the outside temperature and the input temperature of the fluid. If the calculated output temperature is greater than or equal to a predetermined limit value, the control device switches the mode of the heat exchanger arrangement from recooling mode to emptying mode. When outside temperatures are low, below the freezing point of the fluid (which is preferably water), a risk of the fluid freezing can be detected from the computed output temperature of the fluid as it exits the heat exchanger arrangement. To prevent the fluid from freezing in the tubes or the distributors of the heat exchanger arrangement in such a situation, the control device switches to emptying mode as quickly as possible, in which the fluid located in the tubes can drain out of all the tubes simultaneously into the first and the second distributors and, where applicable, the third diverter distributor (in the four-pass heat exchanger), and thence through the connector pieces (first, second, and fourth connector pieces), arranged at the lowest point of the respective distributor, out of the region at risk of frost and into a fluid line connected to said connector pieces.

These and other features and advantages of the invention will become apparent from the exemplary embodiment described in more detail below with reference to the accompanying drawings, in which.

Figure 1:
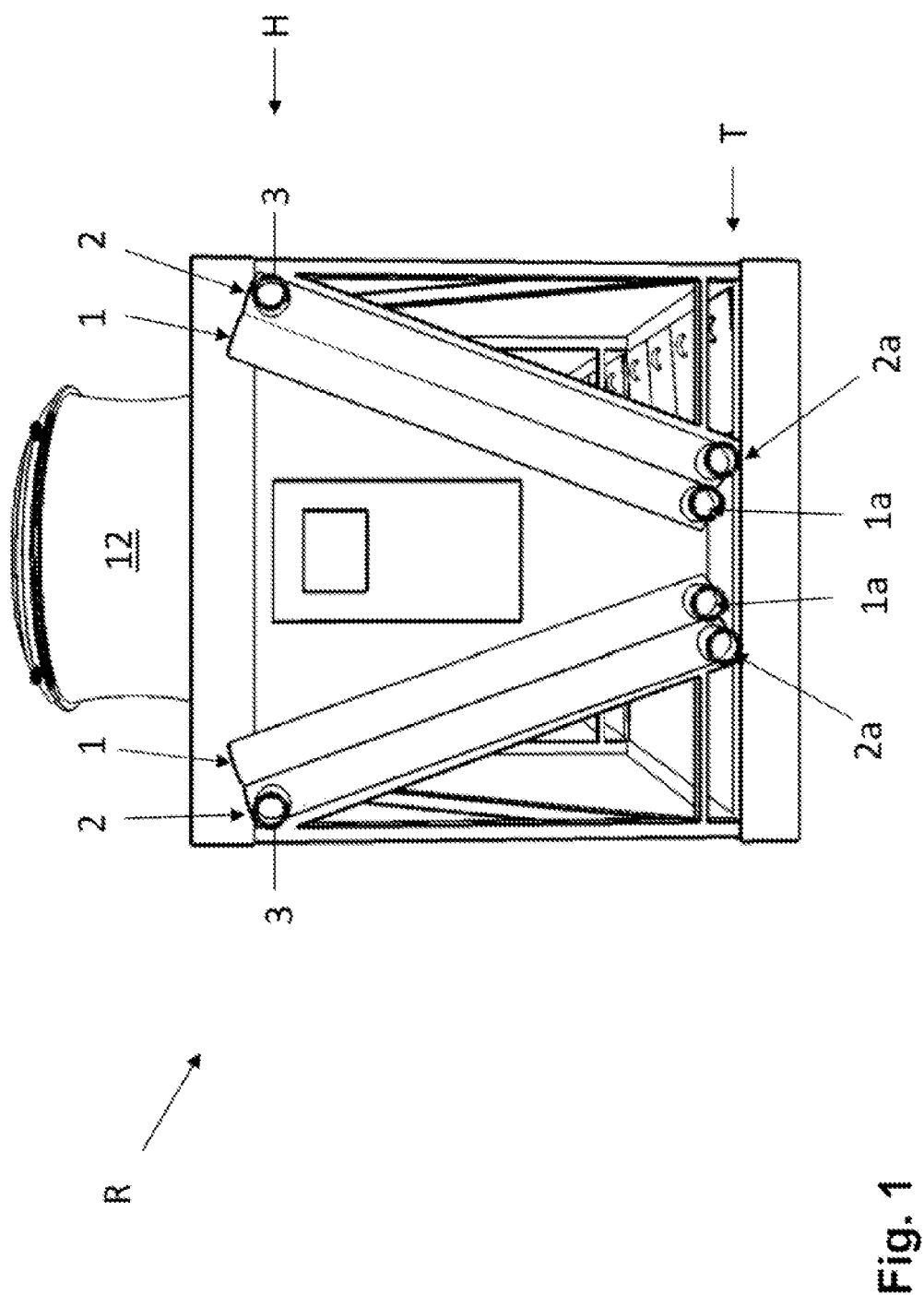
FIG. 1 is a view towards a front end face of a preferred exemplary embodiment of a heat exchanger arrangement according to the invention, having two, two-pass heat exchangers arranged in a V-shape with respect to one another.
Figure 2:
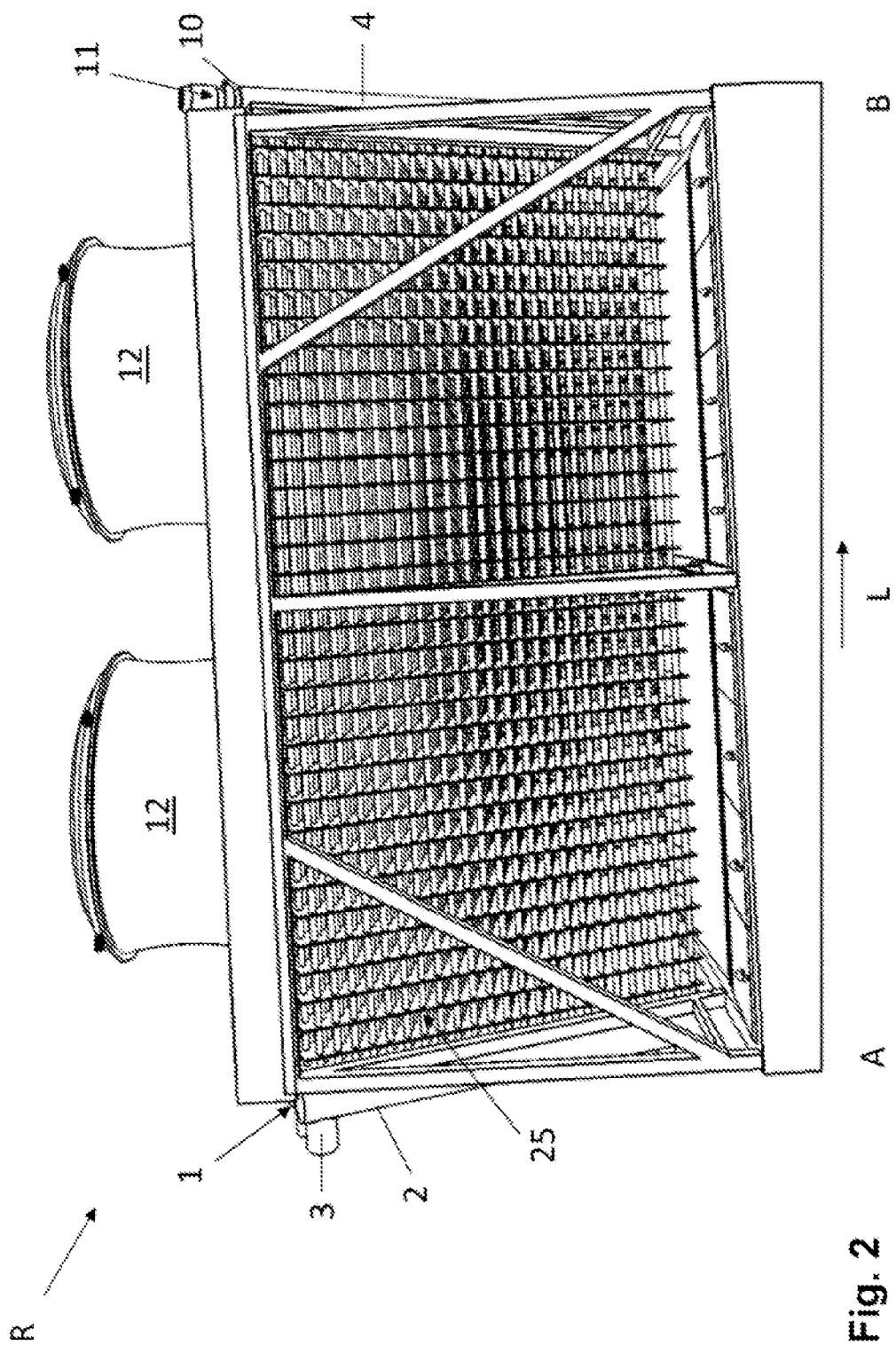
FIG. 2 is a side view of the two-pass heat exchanger arrangement of FIG. 1.
Figure 3:
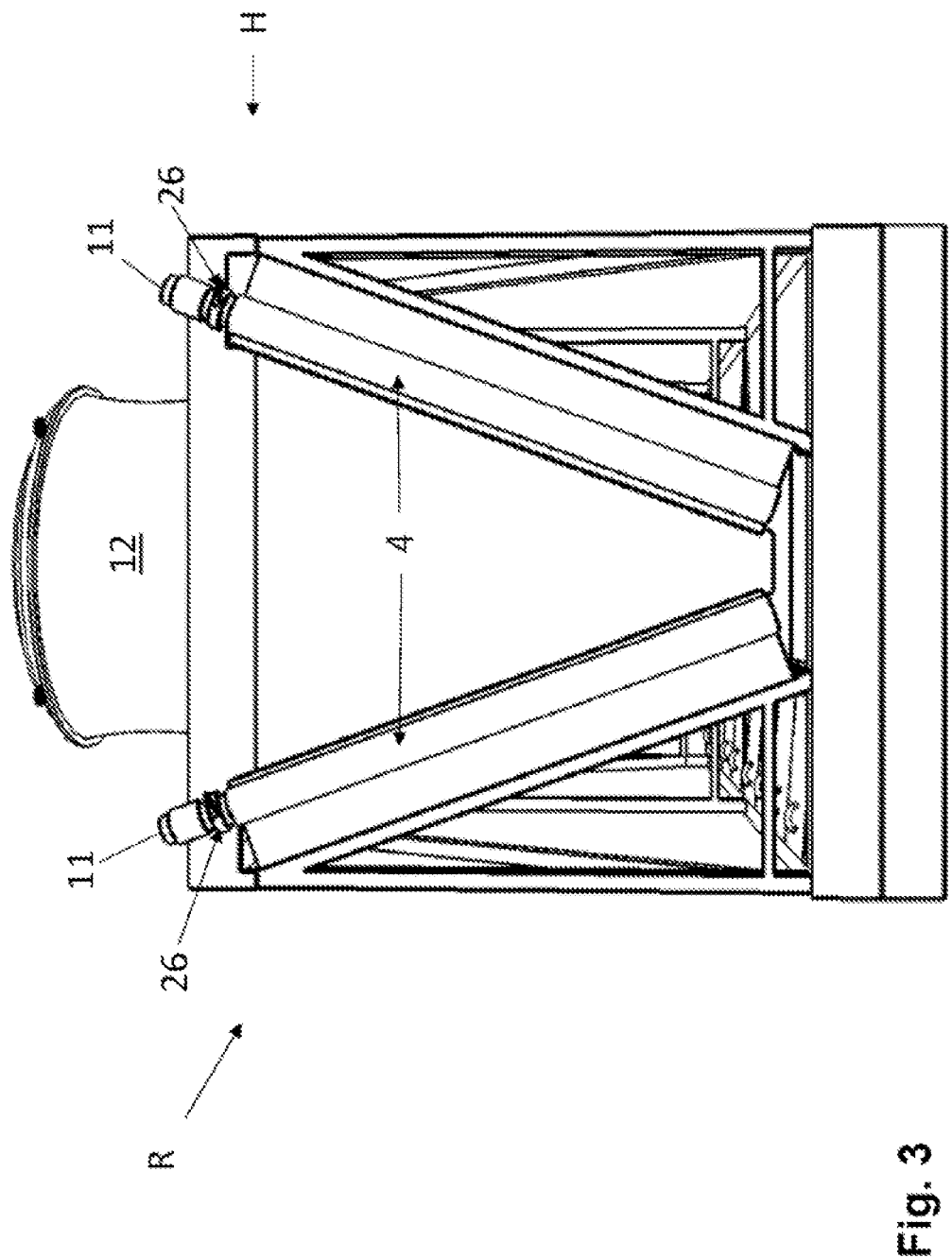
FIG. 3 is a view towards the rear end face of the two-pass heat exchanger arrangement of FIG. 1.
Figure 4:
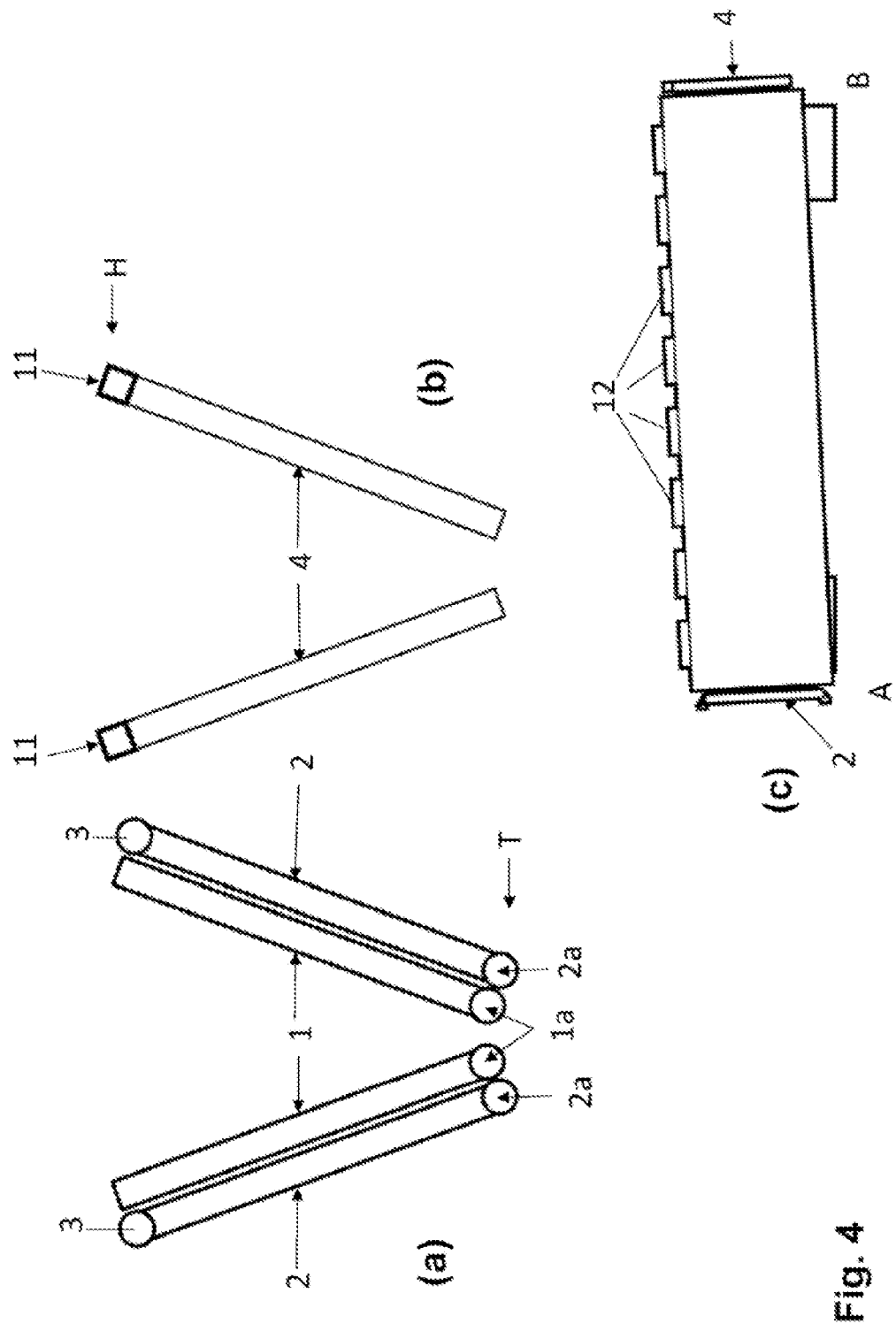
Figure 7:
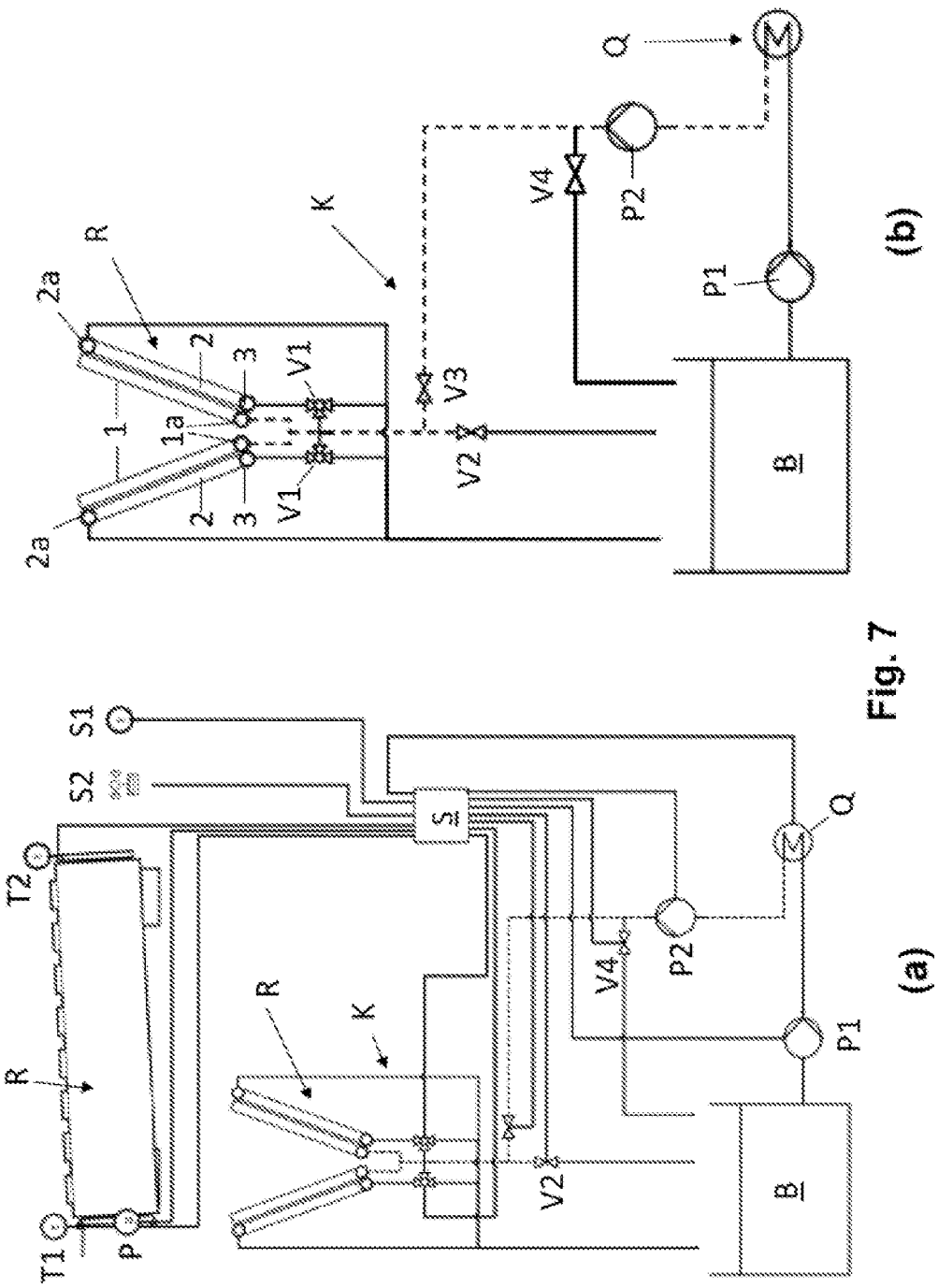
Figure 8:
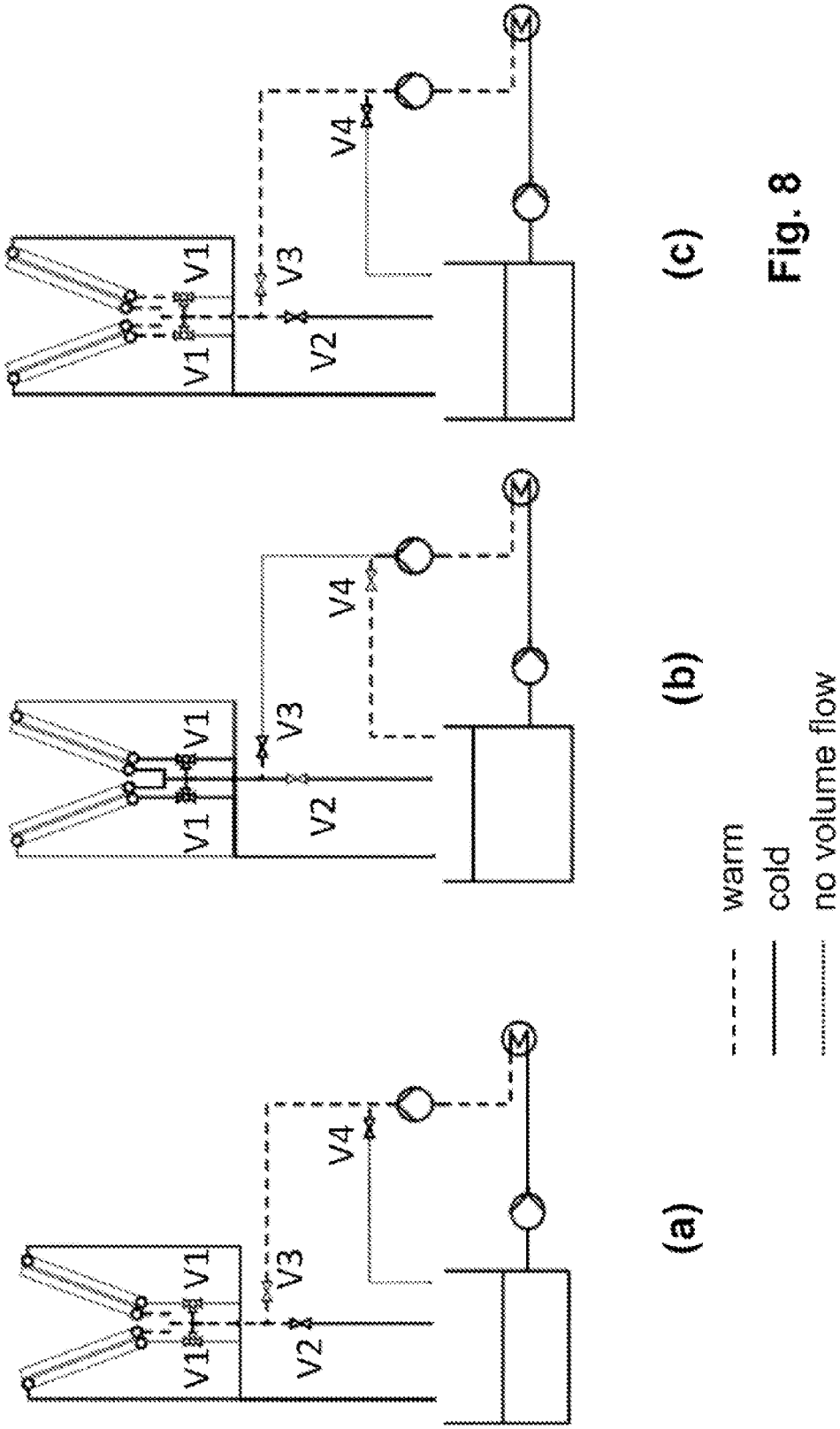
Figure 9:
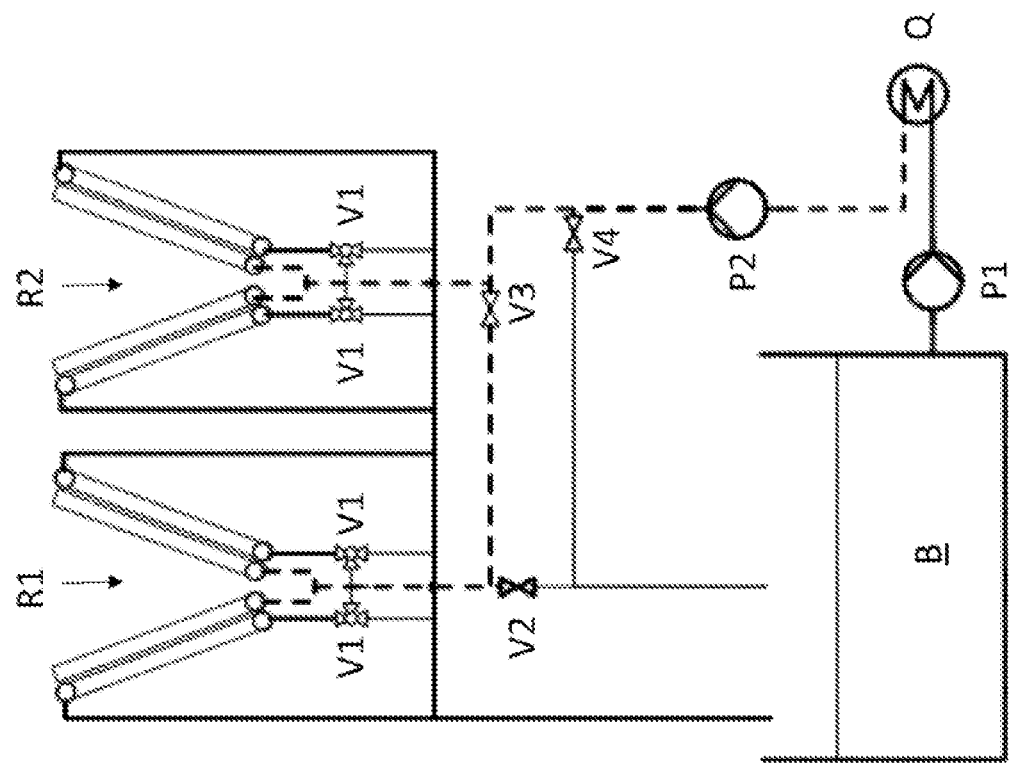
Figure 10:
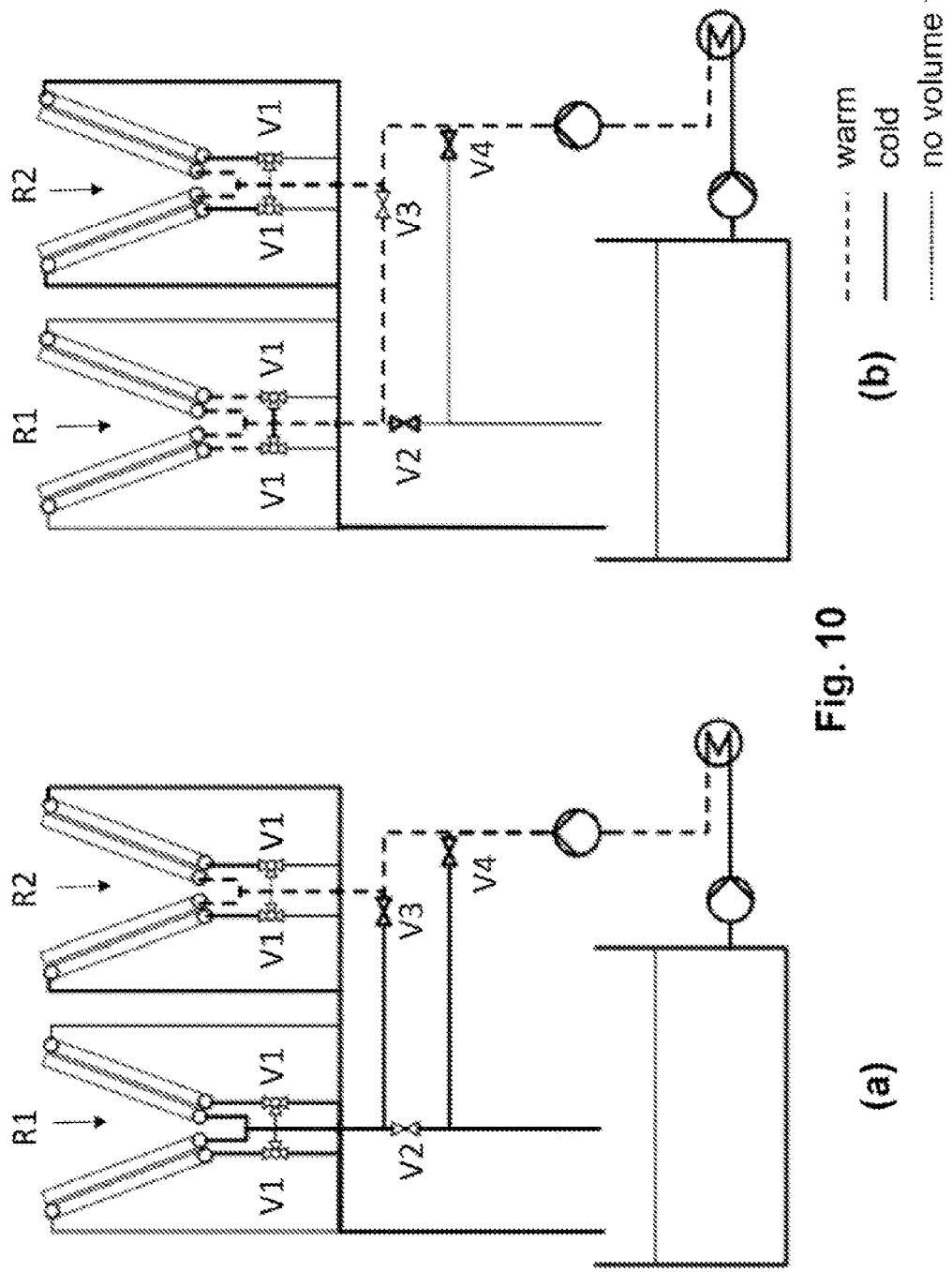
Figure 11:
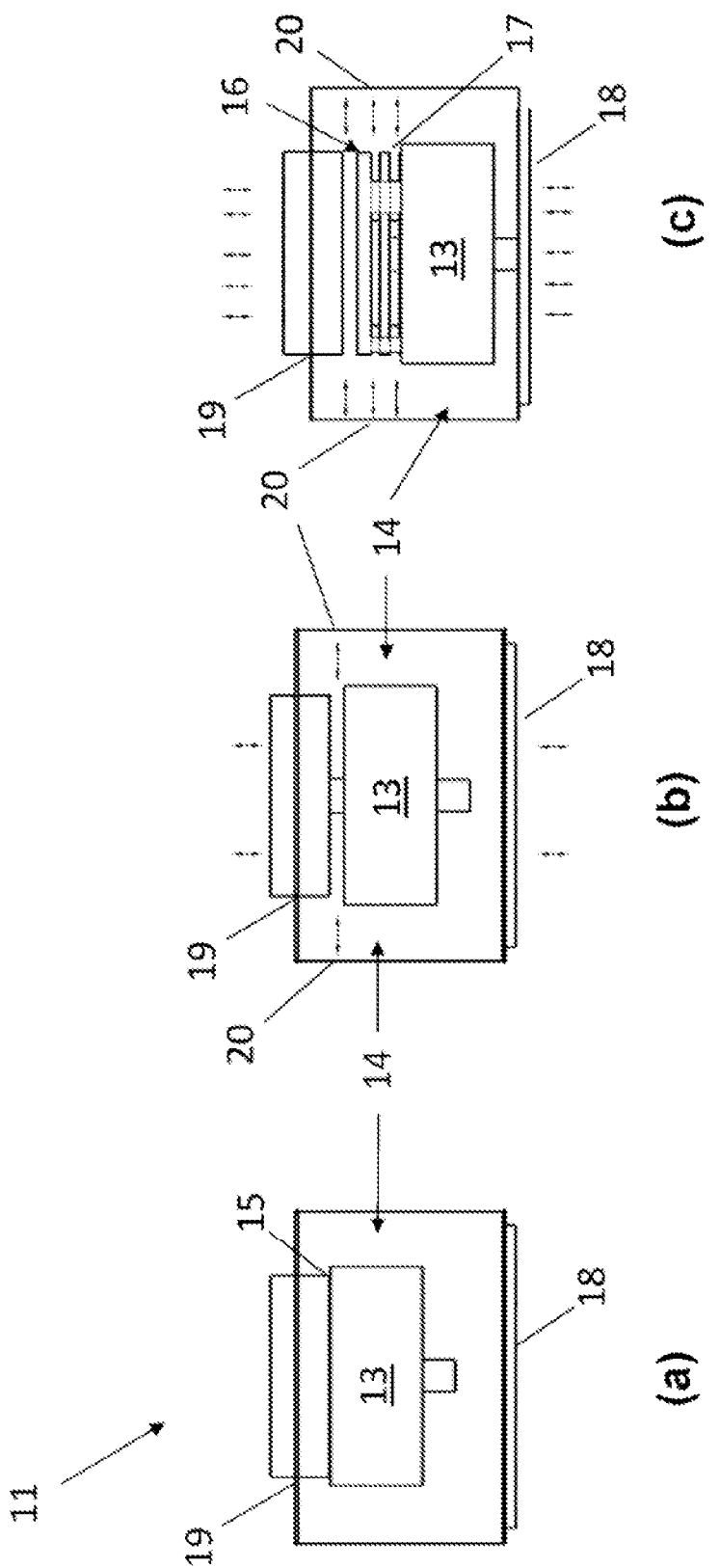

FIG. 4 is a schematic overview of the exemplary embodiment of a heat exchanger arrangement according to the invention of FIGS. 1 through 3, having two, two-pass heat exchangers arranged in a V-shape with respect to one another, in a view towards the front end face of the heat exchanger arrangement (FIG. 4a), towards the rear end face of the two-pass heat exchanger arrangement (FIG. 4b), and in a side view (FIG. 4c);

FIG. 5 schematically illustrates various operating modes of the two-pass heat exchanger arrangement of FIG. 4, wherein the flow direction of the fluid is shown by arrows and wherein FIG. 5a shows a recooling mode, FIG. 5b shows a filling mode, and FIG. 5c shows an emptying mode of the two-pass heat exchanger;

FIG. 6 illustrates the various operating modes of the two-pass heat exchanger arrangement from FIG. 4 on the basis of cross-sectional drawings of the two-pass heat exchanger through a horizontal plane, wherein FIG. 6a shows the recooling mode, FIG. 6b shows the filling mode, and FIG. 6c shows the emptying mode of the two-pass heat exchanger, and FIG. 6d shows a sectional view through the tube arrangement of the heat exchanger arrangement in a sectional plane perpendicular to the tubes;

FIG. 7 is a schematic view of a cooling system containing a heat exchanger arrangement according to the invention having two, opposite, two-pass heat exchangers, wherein FIG. 7a shows the entire cooling system and the heat exchanger arrangement used therein in both a view towards the front end face and a side view, and FIG. 7b shows a detail of FIG. 7a in the region of the heat exchanger arrangement;

FIG. 8 schematically illustrates various operating modes of the heat exchanger arrangement of the cooling system of FIG. 7, wherein FIG. 8a shows the heat exchanger arrangement in recooling mode, FIG. 8b shows the heat exchanger arrangement in emptying mode, and FIG. 8c shows the heat exchanger arrangement in filling mode;

FIG. 9 is a schematic view of a further exemplary embodiment of a cooling system having a combination of two heat exchanger arrangements according to the invention;

FIG. 10 schematically illustrates possible operating modes of the combination of heat exchanger arrangements from FIG. 9;

FIG. 11 is a schematic view of an automatically-closing valve for use in a heat exchanger arrangement according to the invention, in various operating positions of the valve.

FIGS. 1 and 2 show an exemplary embodiment of a heat exchanger arrangement according to the invention which can be used as a recooler R for cooling a fluid used as a heat transfer medium in a cooling system. In particular, water can be used as the heat transfer medium. Where reference is made to water below, the fluid used as the heat transfer medium is what is meant, wherein another fluid can also be used as the heat transfer medium instead of water.

The heat exchanger arrangement shown in FIGS. 1 and 2 contains two, two-pass heat exchangers which contain flat heat exchangers arranged opposite one another and running obliquely to the vertical. As can be seen from the view of FIG. 1, the two heat exchangers are arranged in a V-shape with respect to one another. The structure of the heat exchanger arranged on the left-hand side of FIG. 1 is explained below. The opposite heat exchanger arranged on the right-hand side of the heat exchanger arrangement is constructed similarly. The two heat exchangers are attached to a housing 21 of the heat exchanger arrangement. Each heat exchanger comprises a first distributor 1, which is in the form of an inlet distributor, a second distributor 2, which is in the form of an outlet distributor, a first diverter distributor 4, and a plurality of tubes 5. The first distributor 1 and the second distributor 2 are arranged at the front end face A of the heat exchanger arrangement. The diverter distributor 4 is arranged at the opposing end B of the heat exchanger arrangement, i.e., on the rear end face. The tubes 5 extend in a longitudinal direction L of the heat exchanger arrangement from the one end A to the opposing end B. In the process, the tubes 5 are divided into a first group of tubes 5a and a second group of tubes 5b, wherein the first group of tubes 5a serve as supply lines, and the second group of tubes 5b serve as recirculating lines. The tubes 5 of the first group of tubes 5a (supply lines) connect the first distributor 1 (inlet distributor) to the diverter distributor 4, and the tubes 5 of the second group of tubes 5b (recirculating lines) connect the diverter distributor 4 to the second distributor 2 (outlet distributor), as can be seen from FIG. 6. The tubes 5 of the supply and recirculating lines are at least substantially parallel to one another and are slightly inclined relative to the horizontal, as can be seen in FIGS. 2 and 4c. The slope angle of the tubes 5 relative to the horizontal is preferably between 0.5° and 5°—particularly preferably, between 2° and 4°—and, in a preferred exemplary embodiment, the angle between the tubes and the horizontal plane is 3°.

A first connector piece 1a is arranged on the first distributor 1 (inlet distributor) at a lowest point T of this distributor 1. A second connector piece 2a is also arranged at a corresponding location, i.e., at a lowest point T, on the second distributor 2 (outlet distributor). On the second distributor 2 (outlet distributor), an additional connector piece, referred to as the third connector piece 3, is arranged at a highest point H.

The diverter distributor 4 arranged at the opposing end B of the heat exchanger arrangement has a vent opening 10 at a highest point H, as can be seen in FIG. 2. The vent opening 10 is, expediently, arranged at the top end of the diverter distributor 4, which is in the form of a tubular manifold. The opposite bottom end of the tubular diverter distributor 4 is closed. Expediently, in each vent opening 10, a valve 11 is arranged, by which the vent opening 10 can be opened or closed. To prevent the fluid from exiting through the vent openings 10 when the heat exchangers are completely filled with the filled-in fluid, an automatically-closing valve 11 is, expediently, arranged in the vent openings 10. The valve 11 automatically closes the vent opening 10 as soon as an internal pressure arises in the valve due to the incoming fluid.

FIG. 11 shows a multi-stage valve 11 that can be installed in the vent opening 10 for this purpose, wherein FIGS. 11a, 11b, and 11c show various closing stages of the valve 11.

The valve 11 is configured as an automatically-closing valve that closes by itself when the fluid enters the valve. The valve 11 completely closes only when the diverter distributor is completely filled with fluid, i.e., up to its top end, at which the vent opening is located. This enables the heat exchanger to be completely filled without the fluid being able to flow out of the heat exchanger.

In the embodiment shown schematically in FIG. 11, the valve 11 has a chamber 14 and a float 13 movably mounted therein. In this case, the float 13 is coupled to a valve body 16. An opening 18, 19 is provided at both the bottom end and the top end of the chamber, wherein the top opening 19 is able to be closed in an airtight manner by the float 13 if, when liquid enters the chamber 14, the movable float 13 is raised to such an extent by the buoyancy forces acting on the float 13 that it presses the valve body 16 against a valve seat 15.

A plurality of openings 17 are provided in the valve body 16. These openings 17 are connected to both the bottom opening 18 in the chamber 14 and side openings 20 in the chamber 14, thereby enabling air exchange from the bottom opening 18 to the side openings 20. The plurality of openings 17 forms part of the entire flow cross-section (d) of the valve 11, which results from the sum of the cross-sections of all the openings 17 and the cross-section of the top opening 19 in the chamber 14. When the valve 11 is in the open position shown in FIG. 11*c*, air can flow through the bottom opening 18 into the chamber 14, whence it can escape out of the side openings 20 and through the top opening 19. In this position, the entire flow cross-section (d) of the valve 11 is open for the passage of air.

When the liquid flows into the chamber 14 through the bottom opening 18, the float 13 is raised. In the process, the float 13 initially moves relative to the valve body 16 and closes some of the openings 17 in the valve body, depending upon the level of the liquid in the chamber 14 (FIG. 11*b*). Consequently, as the liquid level in the chamber rises, the flow cross-section of the valve 11 is partially closed and reduced more and more until the float 13 covers all the openings 17 in the valve body 16, as shown in FIG. 11*b*. In this state, excess air, which is displaced upwards by the incoming liquid, can escape from the top opening 19 through the valve seat 15, which is still open. As the liquid level in the chamber 14 rises further, the valve body 16 is pressed upwards and against the valve seat 15 by the float 13. When the valve 11 is in this position, the entire flow cross-section d of the valve 11 is closed in an airtight manner (FIG. 11*a*).

As a result of this configuration of the valve 11, when the fluid enters the chamber 14 of the valve 11, the float 13 can gradually close the valve 11, wherein, initially, the flow cross-section of the valve 11 is only partially closed in one stage, depending upon the level of the fluid flowing into the chamber 14, and the flow cross-section d of the valve 11 is completely sealed in an airtight manner only when a predetermined level limit value is reached in a second stage. Consequently, it can be ensured, on the one hand, that the heat exchanger is fully ventilated while the heat exchanger is being filled with the fluid as long as there is still air in the diverter distributor, and, on the other, that the valve is fully closed as soon as the heat exchanger is completely filled with the fluid.

At least in the second connector piece 2*a*, which is arranged at the bottom end of the second distributor 2 (outlet distributor), another valve (not shown here in the drawing) is inserted for opening and closing the connector piece 2*a*. This valve, which can be actuated by a control device, can, alternatively, also be placed at another location—for example, in a fluid line connected to the second connector piece 2*a*.

FIG. 4 is a schematic overview of the exemplary embodiment of the heat exchanger arrangement according to the invention, showing the front end face of the two-pass heat exchanger arrangement (FIG. 4*a*), the rear end face (FIG. 4*b*), and a side view (FIG. 4*c*). In particular, FIG. 4 shows the placement of the connector pieces 1*a*, 2*a*, and 3 on the first and second distributors 1, 2 (FIG. 4*a*), as well as the slope of the arrangement, and thus of the tubes 5, running in the longitudinal direction L, towards the front end A (FIG. 4*c*).

FIGS. 5 and 6 show various operating modes of the heat exchanger arrangement. In the recooling mode shown in FIGS. 5*a* and 6*a*, water, for example, is conducted through the tubes 5 (supply lines 5*a* and recirculating lines 5*b*) of the heat exchanger arrangement as the heat transfer medium. At the same time, at least one fan 12, which is arranged on the top of the heat exchanger arrangement, as can be seen in FIGS. 2 and 4*c*, draws in (cold) ambient air from the surroundings and conducts it through the heat exchangers of the heat exchanger arrangement in order to perform heat exchange between the heat transfer medium (water) conducted through the tubes 5 and the drawn-in air. To increase the heat transfer efficiency, fins 22 are attached to the tubes 5 (as can be seen from FIG. 6) in order to increase the effective heat transfer area. In the exemplary embodiment shown, the heat exchangers are, accordingly, flat-tube or finned-tube heat exchangers. Instead of conventional flat-tube or finned-tube heat exchangers, micro-channel heat exchangers may also be used in the heat exchanger arrangement according to the invention.

In the recooling mode shown schematically in FIGS. 5*a* and 6*a*, the fluid used as the heat transfer medium is conducted into the first distributor 1 (inlet distributor) via the first connector piece 1*a* (arrows "In"), whence it is conducted through the tubes 5 of the first group of tubes 5*a* (supply lines) to the diverter distributor 4 and deflected therein into the tubes of the second group of tubes 5*a* (recirculating lines). The fluid flows through the recirculating lines as far as the second distributor 2 (outlet distributor). The fluid is withdrawn from the outlet distributor 2 through the third connector piece 3 arranged at the top end of the outlet distributor 2 (arrows "Out") and guided as a cooling medium into a cooling-medium reservoir (tank B) or directly to a consumer to be cooled, via a fluid line 9 connected to the third connector piece 3.

In the recooling mode according to FIGS. 5*a* and 6*a*, the second connector piece 2*a* is closed by the valve arranged therein.

FIGS. 5*b* and 6*b* are schematic illustrations of the heat exchanger arrangement in a filling mode, in which the heat exchangers can either be filled for the first time or refilled with the fluid after having been emptied. In filling mode, the lower connector piece 2*a* (second connector piece) of the second distributor 2 is open. As a result, the fluid can be filled into the first and second distributors 1, 2 simultaneously via the connector pieces 1*a*, 2*a* arranged at the bottom end of the two distributors 1, 2, respectively (arrows "In"). As shown in FIGS. 5*b* and 6*b*, the fluid subsequently flows through all the tubes 5 simultaneously (i.e., through both the supply lines 5*a* and the recirculating lines 5*b*) in the same flow direction from the one end A of the heat exchanger arrangement to the opposing end B. Due to the slope of the tubes 5 towards the front end A, the fluid in the tubes 5 flows upwards counter to gravity in the direction of the diverter distributor 4 arranged at the rear end face B. In the process, the air located in the diverter distributor 4 is pushed out through the vent opening 10 at the top end of the diverter distributor 4, whereby the diverter distributor 4 is ventilated (arrows "Air"). To prevent the fluid from exiting through the vent opening 10 when the heat exchangers are completely filled with the filled-in fluid, an automatically closing valve 11 is, expediently, arranged in the vent opening 10. The valve 11 automatically closes the vent opening 10 as soon as an internal pressure arises in the valve due to the incoming fluid.

To determine when the heat exchanger arrangement is completely filled with fluid, the hydrostatic pressure of the fluid in the heat exchanger arrangement is detected by means of a pressure sensor (p). As soon as the hydrostatic pressure detected by the pressure sensor (p) exceeds a predetermined pressure limit value, the heat exchanger arrangement is switched from filling mode to recooling mode. Alternatively, the control device S of the heat exchanger arrangement can also calculate an expected filling time from the parameters of said arrangement, and the filling mode can be terminated as soon as the calculated filling time has elapsed while the heat exchanger arrangement is being filled with the fluid.

Conversely, analogously to the filling of the heat exchanger arrangement with the fluid, the heat exchanger arrangement can also be rapidly emptied by opening the valve V in or on the second connector piece 2a. FIGS. 5c and 6c show an emptying mode of the heat exchanger arrangement, in which, when the valve in the second connector piece 2a is open, the fluid can flow out of all the tubes 5 simultaneously (i.e., out of both the supply lines 5a and the recirculating lines 5b), under the effect of gravity and in the same flow direction (arrows "Out"), into the first and second distributors 1, 2 along the incline of the tubes 5 from the rear end B to the front end A. The flow of the fluid is promoted, on the one hand, by the slope of the tubes 5 towards the front end A and, on the other, by the diverter distributor 4 being vented (arrows "Air") by means of the vent opening 10. To vent the diverter distributor 4, the valve 11 in the vent openings 10 is open, such that ambient air can flow through the vent opening 10 into the diverter distributor 4. Lastly, the fluid can drain out through the lower connector pieces 1a, 2a (first and second connector pieces) into a fluid line (not shown here) connected to said connector pieces 1a, 2a.

By configuring the heat exchangers in the manner according to the invention, the heat exchanger arrangement can be both rapidly filled with the fluid and (if there is a risk of frost) rapidly emptied, since the fluid can flow in or out through all the tubes 5 of the heat exchanger arrangement simultaneously during both filling and emptying, and in each case in the same flow direction.

When emptying the heat exchanger arrangement, the heat exchangers, and in particular the diverter distributor 4, can be emptied as completely as possible due to the tubes 5 being swan-necked at their tube end opening into the diverter distributor 4. The swan-neck of the tubes 5 at the tube end 5' opening into the diverter distributor 4 is visible in FIGS. 6a through 6c. As shown in FIGS. 6a through 6c, the tube end 5' of some of the tubes 5 opening into the diverter distributor 4 is swan-necked in the direction of the diverter distributor 4 in a swan-neck region 6 that is short compared with the total length of the tubes 5. In the process, the swan-neck region points inwards away from the outer inflow area F, as can be seen from FIG. 6a, which shows the left-hand heat exchanger of the heat exchanger arrangement of FIGS. 1 through 3. The swan-neck region 6 has a different swan-neck angle α for at least some of the individual tubes 5. The swan-neck angle α by which the swan-neck region 6 is swan-necked away from the longitudinal axis is, expediently, between 5° and 90°, and, in particular, in a swan-neck angle range of 20°≤α≤70°. As can be seen from FIG. 6a, the swan-neck angle (α) is smaller in tubes (the supply lines 5a in the example shown) located on the inside (when viewed in the flow direction of the gas stream flowing through the heat exchanger) than in the tubes located further outside (i.e., tubes facing the inflow surface; in this case, the recirculating lines 5b).

As a result of the swan-neck of some of the tubes 5 at their tube end 5' facing the diverter distributor 4, the swan-necked tubes 5 open at least approximately radially into the tubular diverter distributor 4. This enables the fluid to flow out of the diverter distributor 4 unimpeded—particularly when the heat exchanger arrangement is being emptied. Unimpeded outflow of the fluid out of the diverter distributor 4 ensures that the diverter distributor 4 is emptied both quickly and completely. Positioning the tube of the diverter distributor 4 obliquely in relation to the vertical plane can also help empty the diverter distributor 4 completely because, in this case, the fluid can flow unimpeded out of the oblique diverter distributor 4 downwards into the swan-neck region 6 of the swan-necked tubes 5 connected to the diverter distributor 4. Due to the oblique position of the diverter distributor 4, the swan-necked region 6 of the swan-necked tubes 5, which is fastened to the tube of the diverter distributor 4, also runs obliquely to the horizontal plane, thereby assisting the unimpeded draining of the fluid into the tubes 5.

The other tube end 5" of the tubes 5, which is opposite the swan-neck region 6 and is connected to the first or the second distributor 1, 2, opens, expediently, into the relevant distributor 1, 2 straight (i.e., with no swan neck), either centrally with respect to the central longitudinal axis of the relevant distributor 1, 2 (and thus radially into the distributor) or in a manner offset from the central longitudinal axis (and thus tangentially), as shown in FIG. 6a.

FIG. 6d is a sectional view through the tube arrangement 25 of the heat exchanger arrangement in a sectional plane perpendicular to the tubes 5. As can be seen from FIG. 6d, the tubes 5 of the tube arrangement 25 are arranged in columns. The left-hand part of FIG. 6d shows a first possible arrangement of the tubes 5 of the tube arrangement 25 in a matrix form (i.e., with tube rows extending in parallel with one another and columns n1, n2, n3, n4, n5, n6), and the right-hand part of FIG. 6d shows a second possible arrangement in which the tubes of the tube rows are arranged in an offset manner (in every second column, n2, n4, n6). In both arrangements, the number of columns (n1 to n6) is n=6. The number n of columns (n1 to n6) in the tube arrangement 25 results in the minimum cross-section ($D_{min}$) as the product of the number n of columns in the tube arrangement and the tube cross-section ($A_R$) of the tubes 5:

$$D_{min} = n \, A_R.$$

According to the invention, the tube cross-section ($A_U$) of the diverter distributor 4 and the flow cross-section (d) of the valve 11 are selected such that both the tube cross-section ($A_U$) of the diverter distributor 4 and the flow cross-section (d) of the valve 11 are equal to or larger than the minimum cross-section ($D_{min}$), i.e.:

$$A_U \geq D_{min}, \text{ and}$$

$$d \geq D_{min}.$$

The internal diameter of the tubes 5 can be 15 mm, for example, resulting in a tube cross-section of $A_R = 1.7671$ cm². Preferably, n is between 4 and 10, and particularly preferably between 5 and 7. This results in a preferred minimum cross-section ($D_{min}$) of approximately 7 to 18 cm², and, in particular, between 9 and 12 cm².

By way of example, FIG. 7 shows a cooling system in which a heat exchanger arrangement according to the invention may be used. The cooling system shown schematically in FIG. 7 comprises a circuit K in which a fluid—in particular, water—is supplied as the heat transfer medium, a tank B which is connected to the circuit K and in which the fluid is stored, a heat source Q which supplies heat to the fluid at the location of the heat source, and at least one heat exchanger arrangement according to the invention, which is used in the cooling system as a recooler R in order to cool the fluid by heat exchange with the ambient air. In the example shown in FIG. 7, the heat exchanger arrangement having two, two-pass heat exchangers according to FIGS. 1 through 3 is used as recooler R.

In the process, the recooler R of the cooling system is connected to the tank B via fluid lines 9. The tank B is preferably open to the surroundings of the tank location. A fluid line 19 leads from the tank B to the heat source Q in order to supply the cooled fluid, stored in the tank B as the cooling medium, to the heat source Q. A first pump P1 is provided for conveying the fluid from the tank B to the heat source Q. At the location of the heat source Q, the fluid is heated by heat exchange and guided through a further line 29 back to the recooler R. A second pump P2 is, expediently, arranged in the line 29 and conveys the fluid from the heat source Q back to the recooler R. A branch line 30 branches off from the line 29 into the tank B. A valve V4 is provided for opening and closing the branch line 30. Another valve V3 is arranged downstream of the branch line 30 in the line 29. The line 29 branches at a branch point Z into a recirculating line 31 to the tank B and into a feed line 32 leading to the recooler R. A further valve V2 is arranged in the recirculating line 31 for opening and closing this line. The feed line 32 branches into a central feed line and two auxiliary lines, in each of which a three-way valve V1 is arranged. The central feed line branches again into two branches, wherein a first branch is connected to the first connector piece 1a of the left-hand heat exchanger, and a second branch is connected to the first connector piece 1a of the right-hand heat exchanger. The auxiliary lines lead to the second connector piece 2a of the left-hand and right-hand heat exchangers, as can be seen in FIG. 7b. The feed line 32 is thus connected to the lower connector pieces 1a and 2a of the heat exchanger arrangement via the three-way valves V1. Connected to the (upper) third connector piece 3 of the heat exchanger arrangement is a discharge line 33 which leads to and is connected to line 9.

FIG. 8 illustrates various operating modes of the heat exchanger arrangement in the cooling system of FIG. 7. The fluid is shown as a dashed line when in the warm state and as a solid line when in the cold state. Where the line is dotted, there is no flow of fluid.

FIG. 8a shows the cooling system from FIG. 7 in recooling mode. The valves V2 and V4 are closed, so that the lines 30 and 31 are closed. The valve V3 is open, so that the fluid heated by the heat source Q can flow through the lines 29 and 32 to the recooler R. The three-way valves V1 are closed, so that the fluid can flow from the line 32 in each case to the first connector piece 1a of the first distributor 1 (inlet distributor) of the two multipass heat exchangers and thereby enter the heat exchanger arrangement. Once the fluid has passed through the multipass heat exchangers of the recooler R multiple times, the cooled fluid leaves the recooler R at the third connector piece 3 and flows through the line 33 connected to the third connector piece 3 to the line 9, and thence into the tank B, in which the cooled fluid is stored.

In the emptying mode shown in FIG. 8b, the valves V2 and V4 are open, and the valve V3 is closed. The three-way valves V1 are connected in such a way that the fluid can flow from the lower connector pieces 1a, 2a (first and second connector pieces) into the fluid line 9 connected to those connector pieces, and thence directly into the tank B. During emptying of the recooler R, the fluid heated by the heat source Q is returned to the tank B via the branch line 30 when the valve V4 is open, without the fluid being guided through the recooler R.

In the filling mode shown in FIG. 8c, the valves V2 and V4 are closed, and the valve V3 is open. The three-way valves V1 are actuated in such a way that the fluid heated by the heat source Q is conducted via the lines 29 and 32 to the lower connector pieces 1a, 2a (first and second connector pieces) of the multipass heat exchanger, whence it enters the recooler R. Once the heat exchangers of the recooler R are completely full, the recooler is switched to recooling mode (FIG. 8a).

FIG. 9 shows an exemplary embodiment of a cooling system in which two heat exchanger arrangements according to the invention can be used as recoolers R1, R2 in parallel or in series. The two recoolers R1, R2 can, for example, be used simultaneously in series or in parallel to cool the fluid used as the heat transfer medium in the cooling system. When the two recoolers R1, R2 are used simultaneously, a maximum cooling performance of the cooling system is achieved, if a lower cooling performance is required to sufficiently cool the fluid, one of the two recoolers R1 or R2 can be turned off by the control device S of the cooling system.

In parallel operation, in which both recoolers R1, R2 are operated simultaneously in order to cool the fluid, the valves V2 and V4 are closed and the valve V3 is open, so that the fluid heated by the heat source Q can be conducted into the two recoolers R1, R2 through the first connector piece 1a in each case. The fluid cooled in the recoolers R1, R2 exits the recoolers R1, R2 at the third connector piece 3 in each case and flows into the tank B through the fluid line 9 connected to the third connector piece 2a (as shown in FIG. 9).

When the cooling system of FIG. 9 is in the operating mode shown in FIG. 10a, the valves V3 and V4 are closed, and the valve V2 is open. As a result, only the second recooler R2 is operated in recooling mode. The first recooler R1 is in a standby mode, in which no fluid is conducted through the tubes of the first recooler R1.

In the operating mode shown in FIG. 10b, with the valve V3 open and valves V2 and V4 closed, the second recooler R2 is operated in recooling mode, in which the fluid heated by the heat source Q is introduced via the first connector piece 1a into the heat exchangers of the second recooler R2, where it is cooled, and is ultimately guided out of the second recooler R2 through the second connector piece 2a via the fluid line 9 connected to the third connector piece 3 and conducted into the tank B. At the same time, the first recooler R1 is operated in filling mode, in which the fluid is introduced into all the tubes 5 of the first recooler R1 simultaneously via the first connector piece 1a and the second connector piece 2a of the heat exchangers, in order to completely fill the recooler R1 with fluid.

To control the heat exchanger arrangement according to the invention in the various operating modes, a plurality of sensors S1, S2 is, expediently, used, by which environmental parameters, such as the outside temperature ($T_U$) and/or the wind speed (v), can be detected and forwarded to a control device S for processing. In addition to the environmental parameters, the input temperature ($T_{in}$) of the fluid as it enters the heat exchanger arrangement, the temperature of the fluid in the diverter distributors 4, 6, and the pressure or flow rate of the fluid as it enters the inlet distributor 1, are, expediently, detected by means of further sensors T1, T2, P.

The control device (denoted by reference sign S in the diagram of the cooling system in FIG. 7a) is coupled to the valves V, V1, V2, V3, V4 in order to control them. The measured values detected by the sensors S1, S2; T1, T2, P are forwarded to the control device, and the control device calculates an output temperature ($T_{out}$) of the fluid as it exits the heat exchanger arrangement on the basis of the detected measured values. In calculating the value of the output temperature ($T_{out}$), the parameters of the heat exchanger arrangement—in particular, the thermal output thereof, the dimensions of the heat exchangers, the number of times the fluid passes through the tubes, the fluid used as the heat transfer medium, and the volume flow rate of the fluid through the tubes—are taken into account in order to determine a (maximum) cooling of the fluid when the heat exchanger arrangement is emptied. The control device controls the valves of the heat exchanger arrangement in such a way that the heat exchanger arrangement is operated in recooling mode as long as the calculated output temperature ($T_{out}$) is greater than or equal to a predetermined limit value ($T_{min}$). As soon as the calculated output temperature ($T_{out}$) falls below the limit value (i.e., when $T_{out}<T_{min}$), the heat exchanger arrangement is switched to emptying mode. This is done, for example, by electrically or pneumatically actuating the valves V, V1, V2, V3, and V4.

Expediently, the predetermined limit value ($T_{min}$) is a value $\Delta$ above the freezing point of the fluid used as the heat transfer medium (i.e., above 0° C. for water), wherein the value $\Delta$ represents a safety margin from the freezing point. Therefore, even in the event of rapid emptying, it is ensured that the fluid does not freeze if there is a risk of frost. Preferably, the value $\Delta$ (and thus the limit value $T_{min}=0°$ C.+$\Delta$ when water is used as the heat transfer medium) is between 1° C. and 7° C.

Once the heat exchanger arrangement has been completely emptied, it is left in a standby mode, in which the heat exchangers are not filled with fluid. In standby mode, it is monitored whether the risk of frost has passed or is ongoing by calculating the predicted output temperature ($T_{out}$) on the basis of the detected environmental parameters and comparing it with the limit value. As soon as the calculated output temperature ($T_{out}$) is greater than or equal to the predetermined limit value ($T_{min}$), the control device switches the heat exchanger arrangement from standby mode to filling mode. Once the heat exchanger arrangement is completely full, it is switched to recooling mode and operated in that mode until the calculated output temperature ($T_{out}$) is below the limit value.

In the exemplary embodiment in FIG. 9, the heat exchanger arrangement, which comprises a plurality of heat exchangers, is actuated by the control device in such a way that the individual multipass heat exchangers can be operated in the various operating modes independently of one another. In this case, the control device controls the number of heat exchangers operated in recooling mode as a function of the detected environmental parameters and/or the detected input temperature ($T_{in}$) of the fluid, in order to be able to provide a required cooling performance. Expediently, the fluid volume conducted through the heat exchanger arrangement per unit of time remains the same regardless of the number of heat exchangers operated in recooling mode. In the process, the control device monitors whether the temperature of the fluid cooled in the heat exchanger arrangement and stored in the tank is in a preferred temperature range between a minimum and a maximum temperature. The preferred temperature range of the fluid stored in the tank B can be, for example, between 15° C. and 22° C.

The invention claimed is:

1. Heat exchanger arrangement having at least one multipass heat exchanger, which comprises a first distributor, a second distributor, at least one tubular diverter distributor having a predefined tube cross-section, and a tube arrangement having a plurality of tubes which are at least substantially parallel to one another and have a predefined tube cross-section, through which a fluid can flow and which are arranged in the tube arrangement in columns with a predefined number of columns, wherein the first distributor and the second distributor are arranged at one end of the heat exchanger arrangement and the diverter distributor is arranged at the opposing end, and the tubes extend from the one end to the opposing end and are connected to the diverter distributor and to the first or the second distributor, and at least one vent opening is arranged at a highest point or at least in the vicinity of the highest point, of the diverter distributor to equalize the pressure with the surroundings, further comprising:
   a) a valve is arranged in the at least one vent opening and can be opened and closed, wherein a flow cross-section is cleared for the passage of air when the valve is fully opened,
   b) the tube cross-section of the diverter distributor and the flow cross-section of the valve are the same as or larger than a minimum cross-section,
   c) wherein the minimum cross-section is calculated from the product of the number of columns in the tube arrangement and the tube cross-section of the tubes.

2. Heat exchanger arrangement according to claim 1, wherein the valve automatically closes the vent opening when the fluid enters the valve.

3. Heat exchanger arrangement according to claim 1, wherein the valve can be actuated hydraulically, pneumatically, or electrically, or in that the valve mechanically closes when the fluid enters the valve.

4. Heat exchanger arrangement according to claim 3, wherein the valve is actuated hydraulically, pneumatically, or electrically, wherein a control signal closes the valve as a function of a calculated filling time or a measured hydrostatic pressure of the fluid in the heat exchanger arrangement.

5. Heat exchanger arrangement according to claim 1, wherein the valve contains a chamber and a float movably mounted therein, wherein the float closes the valve, and thus the vent opening, when the fluid enters the chamber.

6. Heat exchanger arrangement according to claim 1, wherein the valve is a multi-stage valve and contains a chamber, wherein the vent opening closes gradually when the fluid enters the chamber.

7. Heat exchanger arrangement according to one of claim 5, wherein the vent opening is closed fully and in an airtight manner by the valve as soon as the fluid in the chamber of the valve reaches a predetermined level.

8. Heat exchanger arrangement according to claim 5, wherein a valve body is movably mounted in the chamber, wherein the valve body is first moved in the direction of a valve seat when the fluid enters the chamber and is ultimately pressed against the valve seat.

9. Heat exchanger arrangement according to claim 8, wherein the valve body has a plurality of openings which form part of the flow cross-section of the valve, and in that the valve body is coupled to the movably-mounted float, which closes the openings smoothly as the internal pressure in the chamber increases.

10. Heat exchanger arrangement according to claim 1, wherein the number of columns in the tube arrangement is between 4 and 10.

11. Heat exchanger arrangement according to claim 1, wherein the minimum cross-section is between 5 and 35 cm$^2$.

12. Heat exchanger arrangement according to claim 1, wherein the tube cross-section of the diverter distributor is larger than the flow cross-section of the valve.

13. Heat exchanger arrangement according to claim 1, wherein the diameter of the diverter distributor is between 30 mm and 200 mm.

14. Heat exchanger arrangement according to claim 1, wherein a manually-operable or an electrically-actuatable inspection valve is arranged on the diverter distributor in addition to the valve.

15. Heat exchanger arrangement according to claim 1, wherein the tubes are parallel to one another and at an angle to the horizontal, wherein the angle formed by the tubes with the horizontal is preferably between 0.5° and 5°.

16. Heat exchanger arrangement according to claim 1, wherein, in an emptying mode, the fluid flows out of all the tubes into the first distributor and the second distributor under the effect of gravity, wherein ambient air flows through the open valve into the heat exchanger in emptying mode.

17. Heat exchanger arrangement according to claim 1, wherein, in a filling mode, the fluid flows out of the first distributor and the second distributor into the tubes counter to gravity, wherein air escapes from the heat exchanger into the surroundings through the open valve.

18. Heat exchanger arrangement according to claim 17, wherein, in filling mode, the valve is closed automatically when the fluid enters the valve.

19. Heat exchanger arrangement according to claim 18, wherein, in emptying mode, the fluid drains out, under the effect of gravity, via the first connector piece of the first distributor and the second connector piece of the second distributor, into a lower fluid line, which is connected to the first and the second connector pieces.

20. Heat exchanger arrangement according to claim 1, wherein the tubes of a first group of tubes are in the form of supply lines and are connected to the first distributor and to the diverter distributor, and the tubes of a second group of tubes are in the form of recirculating lines and are connected to the second distributor and to the diverter distributor.

21. Heat exchanger arrangement according to claim 20, wherein, in a recooling mode, the fluid flows into the supply lines through the first connector piece and flows out of the recirculating lines through the third connector piece.

22. Heat exchanger arrangement according to one of the preceding claims, wherein the first distributor, the second distributor, and the diverter distributor are each in the form of a tubular manifold.

23. Heat exchanger arrangement according to claim 1, wherein the diverter distributor is arranged in a common collector tube having at least one partition wall, which divides the collector tube into two or more regions, and/or in that the first distributor and the second distributor are arranged in a common collector tube, wherein the collector tube comprises a partition element which divides the collector tube into an inflow region and an outflow region.

24. Heat exchanger arrangement according to claim 1, wherein the first distributor and the second distributor are arranged at a front end face of the heat exchanger arrangement, and in that the diverter distributor is arranged at the opposing front face of the heat exchanger arrangement.

25. Heat exchanger arrangement according to claim 1, wherein a controllable valve is arranged in the first connector piece and/or in the second connector piece.

26. Heat exchanger arrangement according to claim 1, wherein a plurality of sensors for detecting environmental parameters.

27. Heat exchanger arrangement according to claim 1, characterized in that at least some of the tubes are swan-necked towards the diverter distributor at their end facing the diverter distributor.

28. Heat exchanger arrangement according to claim 1, wherein the diverter distributor is tubular and arranged in such a way that its longitudinal axis is inclined relative to the vertical.

29. Heat exchanger arrangement according to claim 1, wherein a control device for controlling the heat exchanger arrangement, wherein the heat exchanger arrangement is operable in a recooling mode, an emptying mode, or a filling mode by means of the control device as a function of environmental parameters.

30. Cooling system comprising
  a) a circuit in which water is conducted as a heat transfer medium,
  b) a tank which is connected to the circuit and in which the water is stored,
  c) a heat source which supplies heat to the fluid at the location of the heat source,
  d) and a recooler in which the water is cooled by heat exchange with the ambient air, wherein the recooler contains at least one heat exchanger arrangement according to claim 1.

31. Cooling system according to claim 30, wherein the heat exchanger arrangement can be operated in a recooling mode, an emptying mode, or a filling mode as a function of environmental parameters wherein the fluid
  a) in filling mode, flows out of the first distributor and the second distributor into all the tubes counter to gravity,
  b) in recooling mode, is conducted into the heat exchanger arrangement via the first connector piece (1a) at a lowest point or at least in the vicinity of the lowest point, of the first distributor, and is discharged via the third connector piece at a highest point or at least in the vicinity of the highest point, of the second distributor, and
  c) in emptying mode, flows out of all the tubes, under the effect of gravity, into the first distributor and the second distributor and thence in each case into a fluid line via a connector piece arranged at the lowest point or at least in the vicinity of the lowest point, of the first distributor and of the second distributor.

32. Cooling system according to claim 30, wherein the environmental parameters of the fluid as it enters the heat exchanger arrangement are detected by sensors and forwarded to a control device as measured values, and in that, on the basis of the detected measured values, the control device calculates an output temperature of the fluid as it exits the heat exchanger arrangement, and operates the heat exchanger arrangement in recooling mode as long as the calculated output temperature is greater than or equal to a predetermined limit value, and switches the heat exchanger arrangement to emptying mode when the calculated output temperature is below the limit value.

* * * * *